(12) United States Patent
Menard

(10) Patent No.: US 10,103,685 B2
(45) Date of Patent: Oct. 16, 2018

(54) TRACKING PHOTOVOLTAIC SOLAR SYSTEM, AND METHODS FOR INSTALLING OR FOR USING SUCH TRACKING PHOTOVOLTAIC SOLAR SYSTEM

(71) Applicant: HELIOSLITE, Le Bourget du Lac (FR)

(72) Inventor: Etienne Menard, Voglans (FR)

(73) Assignee: Helioslite, Le Bourget du Lac (FR)

( * ) Notice: Subject to any disclaimer, the term of this patent is extended or adjusted under 35 U.S.C. 154(b) by 330 days.

(21) Appl. No.: 14/765,600

(22) PCT Filed: Feb. 5, 2014

(86) PCT No.: PCT/IB2014/000114
§ 371 (c)(1),
(2) Date: Aug. 4, 2015

(87) PCT Pub. No.: WO2014/122518
PCT Pub. Date: Aug. 14, 2014

(65) Prior Publication Data
US 2015/0372636 A1 Dec. 24, 2015

Related U.S. Application Data

(60) Provisional application No. 61/760,863, filed on Feb. 5, 2013.

(51) Int. Cl.
*H02S 20/30* (2014.01)
*H02S 20/32* (2014.01)
(Continued)

(52) U.S. Cl.
CPC ............... *H02S 20/32* (2014.12); *F24J 2/38* (2013.01); *F24J 2/5232* (2013.01); *F24J 2/5241* (2013.01);
(Continued)

(58) Field of Classification Search
CPC .......... H02S 20/00; H02S 20/10; H02S 20/30; H02S 20/32; Y02E 10/47; Y02E 10/50; F24J 2/38; F24J 2/5417; F24S 50/20
See application file for complete search history.

(56) References Cited

U.S. PATENT DOCUMENTS

2004/0238025 A1* 12/2004 Shingleton ................. F24J 2/38
136/246
2011/0203640 A1* 8/2011 Domingo Cabo ...... H02S 20/32
136/246
(Continued)

FOREIGN PATENT DOCUMENTS

DE 102010024546 A1 12/2011
EP 2180524 A2 4/2010

OTHER PUBLICATIONS

International Search Report of PCT/IB2014/000114, dated Jun. 30, 2014.

*Primary Examiner* — Lindsey Bernier
(74) *Attorney, Agent, or Firm* — Banner & Witcoff, Ltd.

(57) ABSTRACT

A tracking photovoltaic solar system, and methods for installing or for using such tracking comprising at least a dual axis tracker unit maintaining an array of photovoltaic modules aligned to the sun. Said tracker unit includes: a pair of sub-frames supporting photovoltaic modules, a torque tube supporting said subframes rotating around a primary rotation axis, a pole structure fixed and extending vertically above an anchoring basis and being rotatively connected to said longitudinal support, secondary rotating means controlling the orientation of said sub-frames around corresponding secondary rotation axis of said sub-frames, said secondary rotation axis being orthogonal to said primary rotation axis and actuators means for controlling said primary and secondary rotating means. The secondary rotation axis are located at each end of said torque tube, said pole structure (Continued)

being central with regard to said sub-frames and said actuators means of both primary and secondary rotating means are linear.

13 Claims, 17 Drawing Sheets

(51) Int. Cl.
*F24S 50/20* (2018.01)
*F24J 2/52* (2006.01)
*F24J 2/54* (2006.01)
*F24J 2/38* (2014.01)

(52) U.S. Cl.
CPC ............. *F24J 2/5424* (2013.01); *F24S 50/20* (2018.05); *H02S 20/30* (2014.12); *F24J 2002/5441* (2013.01); *F24J 2002/5451* (2013.01); *F24J 2002/5458* (2013.01); *F24J 2002/5468* (2013.01); *Y02B 10/20* (2013.01); *Y02E 10/47* (2013.01); *Y02E 10/50* (2013.01); *Y10T 29/49632* (2015.01)

(56) References Cited

U.S. PATENT DOCUMENTS

2012/0152310 A1 6/2012 Hinman et al.
2012/0160991 A1* 6/2012 Kats .................. H01L 31/0543
250/203.4

* cited by examiner

TRACKING PHOTOVOLTAIC SOLAR SYSTEM, AND METHODS FOR INSTALLING OR FOR USING SUCH TRACKING PHOTOVOLTAIC SOLAR SYSTEM

This invention is in the general field of solar power generation.

More specifically, one particularly important, although nonexclusive, application of the invention is in the field of dual-axis photovoltaic solar tracker systems, including concentrator photovoltaic units, capable of tracking the sun during the course of the day with a high degree of accuracy.

The invention relates more particularly but not exclusively to a mechanical design enabling efficient and cost effective production and field installation procedures for such kinds of solar trackers.

The invention also relates to a method for installing and a method for using photovoltaic solar tracker systems such as hereinabove mentioned.

With the increased use of the various Photovoltaic modules approaches, a plurality of deficiencies and shortcomings have emerged that are affecting current users, potential users, system designers, manufacturers, funding entities and sellers of solar-based systems with important cost impacts.

The cost and/or simplicity of feasibility of dual-axis trackers typically increase with the requirements of precise pointing accuracy.

By precise pointing accuracy it has to be understood accuracy in the range of less than 1° degree, for instance less than 0.5°.

Dual-axis solar trackers have become integral parts of modern solar power generation systems and require precise movements and a rigid mechanical structure to reduce deformations when the system is subjected to gravity and wind forces.

This problem is even more relevant for modules having a relatively narrow light angle of acceptance, in particular such as concentrator photovoltaic modules.

The need for accuracy is moreover detrimental to the speed of installation as it implies many parameterizations and calibrations and/or the handling of very heavy and/or robust elements to ensure said accuracy.

Known solar systems are therefore not quickly installable, cannot authorize automated installation procedures and cannot be installed on hilly terrains.

There is therefore a need of low cost and effective dual axis trackers permitting quick and efficient installation at lower maintenance costs but still providing a precise pointing accuracy.

One of the aims of the invention is to provide a dual-axis tracker which is capable of maintaining a very high degree of accuracy, for instance less than 0.2° even less than 0.1°, over the entire life of the system, like for 25 year or more, and with minimal human intervention.

Most of dual-axis photovoltaic trackers rely on the use of a single large diameter vertical pole supporting a single large array of photovoltaic modules with a total area typically exceeding 50 $m^2$.

Particularly to resist wind forces, the vertical pole is typically deeply anchored onto a large concrete block which is often partially or fully buried into the ground.

Large concrete blocks have a weight which is greater than 7,000 kg to ensure good fixation of vertical pole trackers, and so are expensive to produce and difficult to handle.

For standard central pedestal trackers, the torque of the wind pressure forces transmitted to the system foundations is roughly proportional to the post height multiplied by the overall area of the tracker panels.

The foundation imposes means such as concrete mixers on site that makes more difficult or even prohibit pre-assembly of the components.

Poured concrete foundations are relatively expensive from both a material usage and from a labor standpoint and require long drying time (typically>20 days) before these foundations can start to withstand mechanical loads. Several man equivalent hours of work are typically required to complete this type of labor intensive work in the field, especially in hard soils or when large rocks are present in the ground.

Photovoltaic trackers having a surface greater than 50 $m^2$ are typically installed using large crane trucks. Availability of this type of equipment can be problematic in some areas or when Photovoltaic systems are installed on remote sites.

In addition, site access can be problematic for this type of equipment and heavy crane trucks are difficult to operate on uneven or soft grounds. The use of such equipment typically results in installation procedures, which tend to be relatively slow and labor intensive.

These installation procedures cannot be easily automated due to the size of the equipment required to manipulate large scale steel structures. During operation of the solar farm, regular cleaning and maintenance procedures typically require the use of man-lifts. Use of labor intensive maintenance procedures can represent a significant fraction of the overall system operational cost.

For trying to limit heavy foundations, it is already known (US 2012/0196689 A1), where two small diameter shafts are used to drive an array of tracker units connected by gear boxes.

However, here the achievable tracking accuracy of each tracker unit is limited by the mechanical twist of the transmission shafts and quality (i.e. backlash) of the compliant linkages.

A tracking accuracy greater than +/−0.2° degrees using this type of series connection configuration is too difficult to achieve repetitively from a mechanical design standpoint.

In addition, this configuration is economically viable only in the case of very small mini-tracker units, as the separation distance between each tracker dictates the required length of the linkage shaft segments. Very long (i.e. >10 m) linkage shaft segments would require extra mechanical support to prevent excessive bending.

Moreover, any ground settling during the operation life of the system may lead to angular drifts of the individual tracker units. When such angular drift exceeds the required tracking accuracy, the linkages between each tracker units need to be re-adjusted to re-align the entire system.

It is also known (U.S. Pat. No. 8,188,413) to rely on the use of common torque tube to rotate a set of photovoltaic panels around a horizontal primary axis. The torque tube is typically segmented in sub-units which are mechanically linked together using rigid couplings. Each torque tube section is designed to support the load of two photovoltaic panels positioned on each side of each torque tube segment. A common linear actuator is used to drive and tilt a linear array of photovoltaic panels. Multiple linkage rods are used to transfer the linear motion of the common linear actuator.

Here again the overall system achievable accuracy is limited by the quality of the joints which are used to interconnect the linkage rods. The linkage rods need to prevent buckling under load. Due to the overall stiffness of the common torque tube, this design configuration requires tight alignment tolerances and such system cannot easily be installed, for instance on uneven grounds. In addition, any soil settling has a direct impact on the system pointing accuracy.

Here again the length of the linkage rods may need to be re-adjusted periodically in the field in order to maintain the overall system tracking accuracy during the life of the plant.

It is also known (US2012/0152310) to use linear actuators which are used to tilt each photovoltaic panel individually.

These trackers also rely on the use of poles anchored onto concrete posts and typically cast on site into holes drilled into the ground.

These trackers comprise torque tube segments to the center of which they are attached.

The torque tubes are mechanically linked together at each post using roll bearings which need to be very precisely aligned in the field using high precision alignment techniques.

As multiple torque tube segments are connected in series, the achievable tracking accuracy of the individual tracker units is limited by mechanical twist of the torque tubes and quality of the roll bearing joints.

The quality of the roll bearing linkages, torsion stiffness of the torque tube segments and backlash of the slewing ring actuator limits the number of units which can be driven by a common actuator.

In addition, this configuration may be economically viable from a material usage standpoint only when very small modules paddle assemblies are connected by short torque tube segments.

Long (i.e. >10 m) torque tube segments would inevitably sag or require a cost prohibitive amount of metal to provide an appropriate stiffness. The small metal posts and concrete foundations need to be sized appropriately to withstand wind pressure forces transmitted by each modules paddle assembly.

The aim of the present invention is to provide a system and methods, better meeting the requirements of practice than those previously known, especially in that the invention allows:

i) significant reduction of the amount of metal required in order to decrease system and transport costs while maintaining excellent planarity when the tracker frames are exposed to external mechanical loads (gravity and wind forces), ii) reduction of foundation costs, iii) small scale structures (i.e. individual frames supporting panels with an area≤20 m$^2$) which can be manufactured, installed and cleaned using automated procedures, iv) simpler wiring scheme eliminating the need to run AC wires to power each tracker unit, vi) independent dual axis control to each tracker unit in order to correct for ground shifting without mechanical realignment and therefore guarantee optimum tracking accuracy and excellent system availability, vii) the use of fast field installation procedures requiring no manual adjustment nor precise alignment step.

For this purpose, the invention essentially provides a tracking photovoltaic solar system comprising at least a dual axis tracker unit maintaining an array of photovoltaic modules aligned to the sun during the course of the day, wherein said tracker unit includes:

a pair of sub-frames, each sub-frame supporting half of said array of photovoltaic modules, a primary longitudinal support or torque tube for supporting said sub-frames, primary rotating means for rotating said torque tube around a primary rotation axis, a pole structure fixed and extending vertically above an anchoring basis, said pole structure being rotatively connected to said torque tube, secondary rotating means controlling the orientation of said sub-frames around corresponding secondary rotation axis of said sub-frames, said secondary rotation axis being orthogonal to said primary rotation axis and actuators means for controlling said primary and secondary rotating means for maintaining the array of photovoltaic modules aligned to the sun, characterized in that said secondary rotation axis are located at each end of said torque tube, said pole structure being central with regard to said sub-frames and said actuators means of both primary and secondary rotating means are linear.

Unlike traditional dual axis trackers, the herein disclosed design provides an effective means for distributing wind and gravity forces.

In some advantageous embodiments, it is also and/or further proposed an apparatus including or not one and/or more of the following features:

the pole structure comprises at least two elements vertically supporting the torque tube the primary actuators means are mounted on said pole structure;

the two elements comprise two vertical beams which are cross linked by structural members defining substantially a plane including or parallel to the primary rotation axis;

the pole structure defining substantially a plane parallel or including at least partially the torque tube, it comprises a set of stays attached to the pole structure and extending in planes orthogonal to the plane of the pole structure, with an angle relative to the ground comprised between 20° and 70°;

This permit in particular, with multiple anchor points distributed on a large surface of the ground, an excellent redistribution of the wind and gravity forces.

the torque tube extending along a longitudinal axis, the primary axis of the primary rotating means is offset from said longitudinal support center axis;

the primary rotating means comprise at least one pair of sheaves linked by a wire rope, with the first sheave being mechanically attached to the torque tube and wherein said wire rope is arranged to transfer the linear motion of a linear actuator of said actuator means into rotation of said first sheave around the primary rotation axis of said tracker unit;

the wire rope is fixed on the sheave which is mechanically attached to the torque tube. This will take care of the risk of slack in the mechanical connection between the wire and sheave;

the linear actuator for rotation of the sheave is collinear or parallel with the first linear section of the wire rope;

the linear actuator for rotation of the sheave comprises two electric jacks disposed on each side of the first linear section of the wire rope;

the tracking photovoltaic solar system comprises two pairs of sheaves, each pair being respectively linked by a wire rope, and in that the linear actuator comprises one jack situated between said two pairs of sheaves;

the linear actuator for rotation of the pair of sheaves is collinear or parallel with the first linear section of each wire rope;

each array of photovoltaic modules supported by each sub-frame includes two sub-arrays of photovoltaic modules located on each side of said tracker unit torque tube;

the pair of sub-frames are controlled by a common actuator and mechanically cross-linked with a coupling mechanism permitting said pair of sub-frames to rotate in unison around their respective second rotation axis and maintaining the parallelism between the arrays of photovoltaic modules supported by each sub-frame;

the tracking photovoltaic solar system comprises a linear array comprising a plurality of said dual axis tracker units and in that said dual axis tracker units are controlled by a distributed array of electronic controllers, and in that said distributed array of electronic controllers comprises a single master controller and multiple slave controllers attached to each tracker unit, the master controller being configured to compute the motion trajectories of each tracker unit and to send motion commands to the slave controllers of each tracker unit;

each slave controller of the corresponding tracker-unit is connected to an electrical bus attached to or supported by a stay of said tracker unit which defines a housing for said electrical bus which is then connected to the master controller;

an array of fixed non-concentration PV modules is attached to said wire ropes;

the tracking photovoltaic solar system is to be installed on the ground and the anchor basis comprises a pre-cast concrete block and a set of anchor structures made out of structural steel profiles driven into the earth ground;

the tracking photovoltaic solar system comprises a tensioning device, said tensioning device including the sheaves that are vertically installed with respect to each other and one of the sheave is movable with respect to the other, and the tensioning device includes means for adapting the distance between the sheaves so as to correspond to the eccentricity of the other sheave or pulley.

Embodiments of the invention could also include and/or be defined by one and/or more of the following features without being out of the scope of the invention:

the tracking photovoltaic solar system is a concentrator photovoltaic solar system comprising a linear array of linked dual axis tracker-units maintaining a segmented array of CPV modules aligned to the sun during the course of the day; wherein:

Each tracker unit includes a pole structure extending vertically above the earth and anchored to ground foundations located bellow each tracker unit;

Each tracker unit includes a primary longitudinal support rotating around a primary axis oriented parallel to the ground surface;

Each tracker unit includes a pair of sub-frames;

Each sub-frame supports an array of CPV modules;

Each tracker unit includes a minimum of two independent actuators and rotation mechanisms controlling the orientation of said CPV modules;

Said sub-frames rotate around a pair of secondary rotation axes;

Said secondary rotation axes are parallel to each other;

Said secondary rotation axes are orthogonal to the primary rotation axis;

Said secondary rotation axes are located at each end of said primary longitudinal support;

the array of two axis tracker units are controlled by a distributed array of electronic controllers;

the vertical support structures are mechanically cross-linked, along said linear array of tracker unit's repetition direction, with an array of structural wire ropes having a combined strength sufficient to counter wind pressure forces exerted onto the CPV arrays of each tracker unit;

the array of structural wire ropes comprise a set of structural wire ropes running parallel to the earth ground and attached between the top extremity of each tracker unit pole structure;

the array of structural wire ropes comprise a set of structural wire ropes attached to the top extremity of each tracker unit pole structure and to the ground foundations of each adjacent tracker unit and to ground anchors positioned at each end of said linear array of tracker units;

the array of structural wire ropes comprise a combination of the said set of structural wire ropes of the two indents above;

each array of CPV modules supported by each sub-frame of each tracker unit includes two sub-arrays of CPV modules located on each side of said tracker unit longitudinal support;

the pair of sub-frames are controlled by a common actuator and mechanically cross-linked with a coupling mechanism permitting said pair of sub-frames to rotate in unison around their respective secondary axis and maintaining the parallelism between the arrays of CPV modules supported by each sub-frame;

the primary axis rotation mechanism of each tracker unit comprises a pair of sheaves linked by a wire rope, with the first sheave being mechanically attached to the primary longitudinal support of said tracker unit and wherein said wire rope transfers the linear motion of a linear actuator into rotation of said first sheave around the primary rotation axis of said tracker unit;

the pair of actuators are linear actuators;

the pair of actuators are linear actuators powered by electric motors;

the vertical support structure comprises a lightweight assembly of metal beam structural elements;

the distributed array of electronic controllers comprises a single master controller and multiple slave controllers attached to each tracker unit;

the master controller comprises a powerful micro-controller to compute the motion trajectories of each tracker units and to send motion commands to the slave controllers of each tracker unit;

the distributed array of electronic controllers share a common low voltage electrical power bus energized by a single centralized electrical power supply;

the low voltage electrical power bus is attached and supported by the structural wire ropes;

each slave microcontroller monitors the current and voltage output of the arrays of CPV modules supported by each sub-frame of said tracker units and send this information to the master controller which optimizes the trajectory of each tracker unit in order to maximize their power output;

the array of CPV modules are electrically connected in a parallel manner to a common high voltage DC power bus;

the common high voltage DC power bus is attached and supported by the structural wire ropes;

an array of fixed non-concentration PV panels are attached, between the tracker units, to said set of structural wire ropes running parallel to the ground earth surface;

each tracker unit foundation comprises a minimum of two anchor structures made out of structural steel profiles driven into the earth ground;

each tracker unit foundation comprises a pre-cast concrete block.

each tracker unit foundation comprises a minimum of two anchor structures made out of structural steel profiles driven into the earth ground and bonded to a pre-cast concrete block;

the installation procedure for each unit ground foundation follows the following process:

Installing pre-cast concrete blocks comprising a minimum of two vertical hole openings onto leveled ground areas;

Installing guiding fixtures comprising roller elements into the hole openings of each pre-cast concrete block;

Driving structural steel profiles into the earth ground using said guiding fixtures;

Removing the guiding fixtures, and

Pouring anchor cement into the hole openings of said pre-cast concrete blocks to secure the steel profiles.

The invention further proposes a method for installing at least a dual-axis tracker unit of a tracking solar system, said tracker unit having the different elements as above described characterized in that it comprises the steps of i) installing pre-cast concrete blocks onto ground areas;
ii) driving structural steel profiles into the earth ground,
iii) securing the structural steel profiles to the pre-cast concrete blocks,
iv) pre-manufacturing a tracker unit as described above,
v) placing horizontally and rotatively fixing the pole structure and torque tube in place on and between the elements of said anchor basis,
vi) fixing each sub-frame supporting half of said array of photovoltaic modules on the torque tube,
vii) elevating by rotation said pole structure after fixating the extremity of the stays on said elements of anchor basis,
viii) finally fixating in place said tracker unit. Advantageously the method is done by:

using blocks comprising a minimum of two vertical hole openings, realizing a previous step to the driving step of installing guiding fixtures comprising roller elements into the hole openings of each pre-cast concrete block; and, then driving step of the structural steel profiles is done using the guiding fixtures before removing the guiding fixtures, pouring anchor cement into the hole openings of said pre-cast concrete blocks to secure the steel profiles, to form the anchor basis of the tracker unit.

The invention further proposes a method for using a tracking solar system as above described characterized in that the system comprising at least a wind gauge connected to at least the master controller, it comprises the steps of:

measuring the current and voltage output of the arrays of photovoltaic modules supported by each sub-frame of said tracker units by each slave microcontroller, acquiring the wind intensity from the wind gauge and sending the information to the master controller, optimizing and commanding accordingly the trajectory of each tracker unit in order to maximize their power output if the wind intensity is under a determined threshold, and commanding each tracker unit to move to a predetermined safety position if the wind intensity is above a determined threshold.

The above and other features and advantages of the present invention will become apparent upon review of the following summarized and detailed descriptions taken in conjunction with the accompanying drawings in which:

FIGS. 1 and 14 illustrate a diagram of an embodiment of the invention consisting of an array (1000) of mechanically cross-linked dual-axis (100) photovoltaic solar tracker units.

Figure 1:
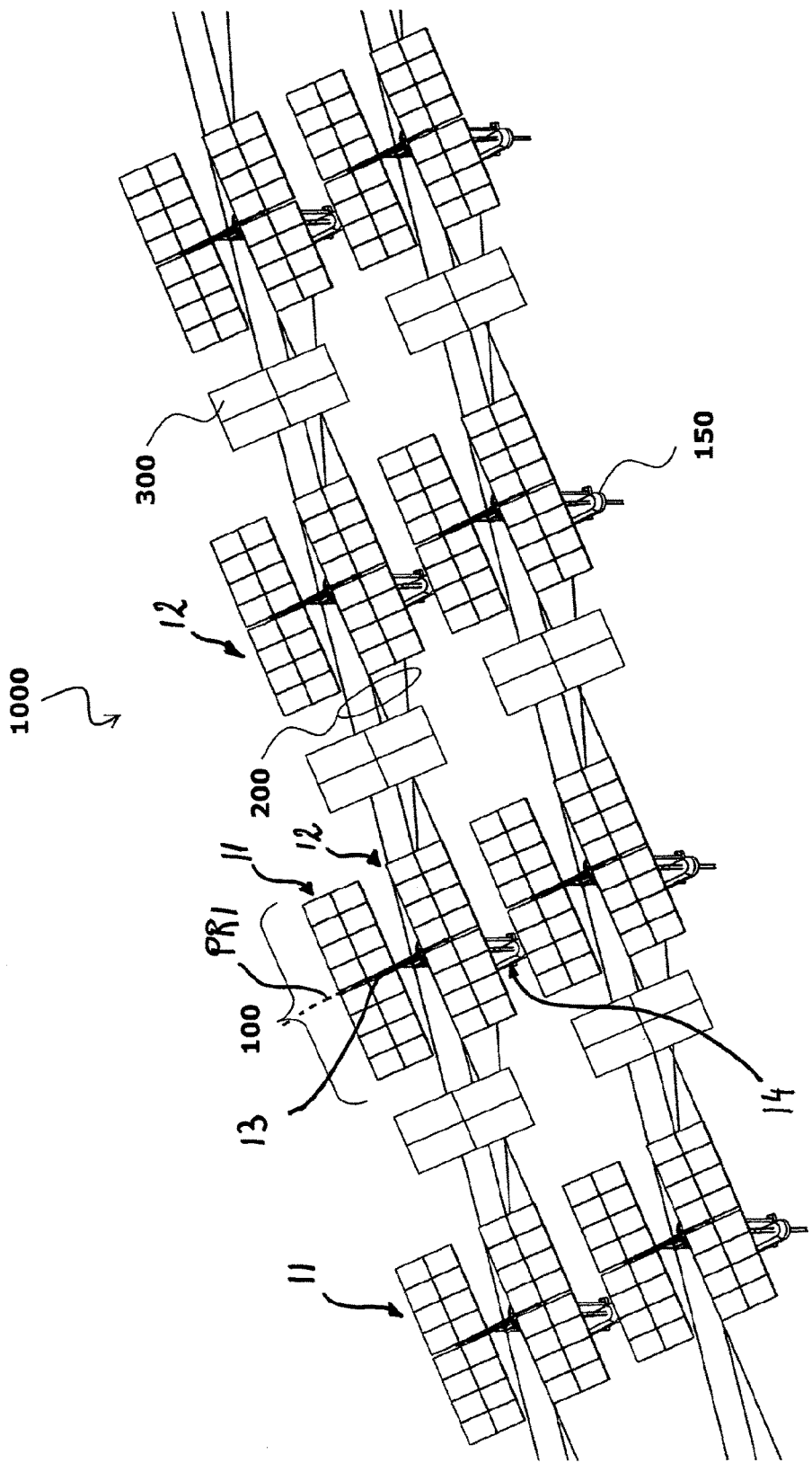
FIG. 1 illustrates a diagram of an embodiment of an array of dual-axis photovoltaic solar tracker units which are mechanically cross-linked.

In the embodiment particularly described herein the photovoltaic solar tracker is populated with concentrator photovoltaic (hereinafter CPV) modules for illustrative purposes. The same photovoltaic solar tracker can also be populated with standard flat-plate photovoltaic panels.

The dual-axis tracker unit (100) comprises a split parallelepipedic frame into at least two substantially identical sub-frames (101, 102) that support photovoltaic concentrator modules.

The dual-axis tracker unit (100) comprises a primary longitudinal support (103) supporting the pair of sub-frames.

The primary longitudinal support is a torque tube and is rotating around a primary rotation axis (PR1).

The pair of sub-frames includes two sub-arrays of photovoltaic modules located on each side of said tracker unit torque tube A pole structure rotatably connected to the torque tube and supporting it, is extending vertically below it and the sub-frames.

The pole structure defines substantially a plane parallel or including at least partially the torque tube.

It comprises at least two elements such as vertical posts, extending vertically above and anchoring basis. The anchoring basis can by supported by the ground or by a roof surface.

The dual-axis tracker unit (100) is linked to a downstream dual-axis tracker unit (11) and upstream to another dual-axis tracker unit (12).

This configuration enables the use of the pole structure comprising cross stiffening structural beams (that will be described more in details in reference to FIG. 4).

The dual-axis tracker unit (100) and the downstream (11) and upstream (12) ones form a linear array of tracker units (100) that are liked by tension members (200), such as wire ropes, to mechanically cross-link them.

The pole structure also comprises a set of stays attached to the pole structure and extending in planes orthogonal to the plane of the pole structure, with an angle relative to the ground comprised between 10° and 80° for instance between 20° and 70°.

The tension members (200) are stays or shrouds and the use of tensioned wire ropes to counter wind moment forces permits the use of significantly lighter foundations.

In another embodiment of the herein disclosed invention, wire ropes (200) running horizontally between individual tracker units, for instance from downstream (11) unit to upstream (12) unit are separated from each other from a distance that enables said ropes to be used to support standard flat-plate modules (300).

Flat-plate modules are such as convertor for converting diffuse light in an effective manner while CPV modules are used to convert direct (well collimated) solar irradiance.

Thus, an hybrid power plant configuration according one embodiment of the invention as described herein, comprising high performance tracked CPV modules and lower performance fixed flat-plate modules, may be advantageous for isolated installation sites which may require more strict energy generation guaranties.

The herein disclosed invention enables the addition of fixed flat-plate module for a very minimal extra installation cost representing another advantage over standard central pole trackers where the main frame rotates around a vertical axis (precluding the use of wire ropes between poles, unless the ropes are attached very close to the ground).

In the following description, similar items are referenced by the same reference numbers.

FIG. 2 A-C illustrate diagrams of exemplary mechanical cross-link attachment embodiments of the herein disclosed invention of an array of tracker units comprising a tracker unit between and downstream (11) tracker unit to upstream (12) tracker unit.

Figure 2A:
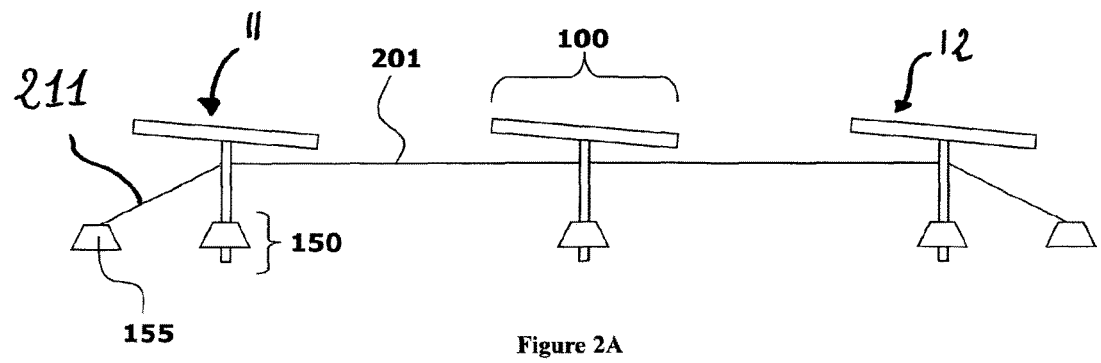
FIGS. 2A, 2B and 2C illustrates diagrams of exemplary mechanically cross-linking embodiments of the invention.
Figure 2B:
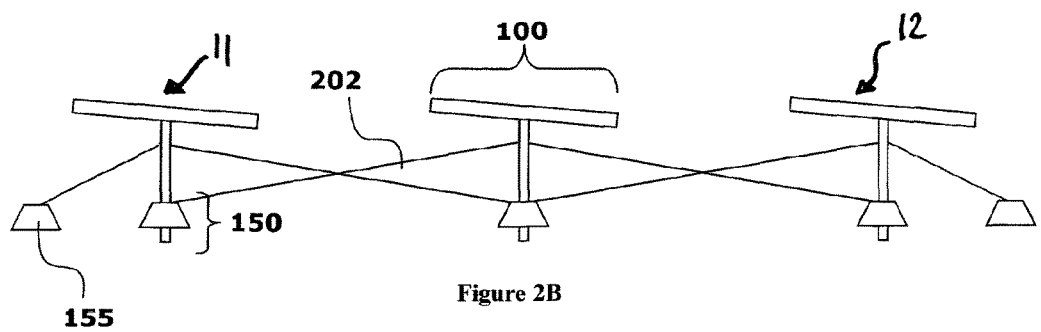

In the embodiment of the invention on the FIG. 2A, a single or multiple collinear wire ropes (201) runs horizontally and is mechanically attached to multiple tracker units (100).

At each end of the tracker units array, the wire ropes (201) runs down from the downstream (110) and upstream tracker units and is connected down (202) at each side to an anchor point (155).

In another embodiment of the invention (FIG. 2B), wire ropes (202) may be attached to a single tracker unit (100) and two adjacent foundations (150) or anchor points (155) on the ground.

Figure 2C:
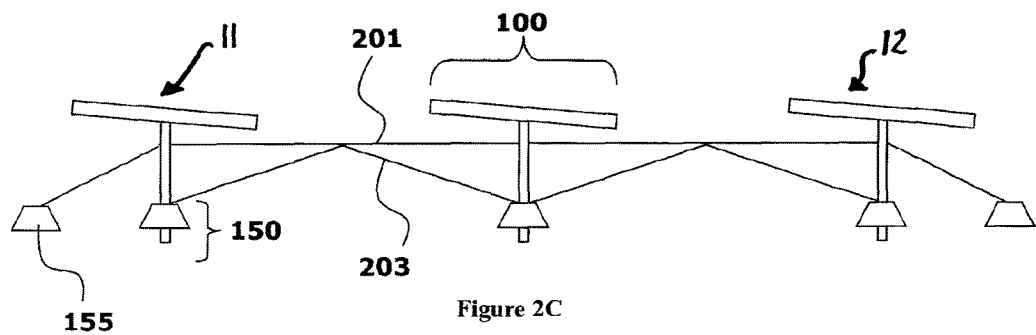

In yet another embodiment of the invention, a mixed of the above listed attachment configurations may be used with wire ropes running horizontally (201) and at an angle (203) (FIG. 2C).

A single of multiple spring loaded tensioning devices may be used along the length of each wire rope to maintain an adequate rope tension during the entire service life of the system.

For all of these configurations, light foundations can be used as the foundations of each tracker units only need to bear a combination of angled pull (wind load) and vertical compression (gravity) forces, but no moment forces.

This represents a critical advantage as the cost of the foundations may represent more than a quarter of the cost of standard central pole pedestal trackers. When the herein disclosed linked trackers are installed on sufficient compact soil in the ground, the foundations may be reduced to bare metal posts driven directly into the ground.

In the case of installations on less compact soils, surface pads (typically consisting of concrete blocks) may be used in order to meet local civil codes pertaining to structures exposed to wind forces.

Unlike regular dual axis tracker designs, the herein disclosed dual axis tracker design enables the use of simple installation procedures such as those for installing fixed (racked) flat plat photovoltaic modules. The concrete foundations may be poured in the field or brought on site as pre-cast blocks.

Figure 15:
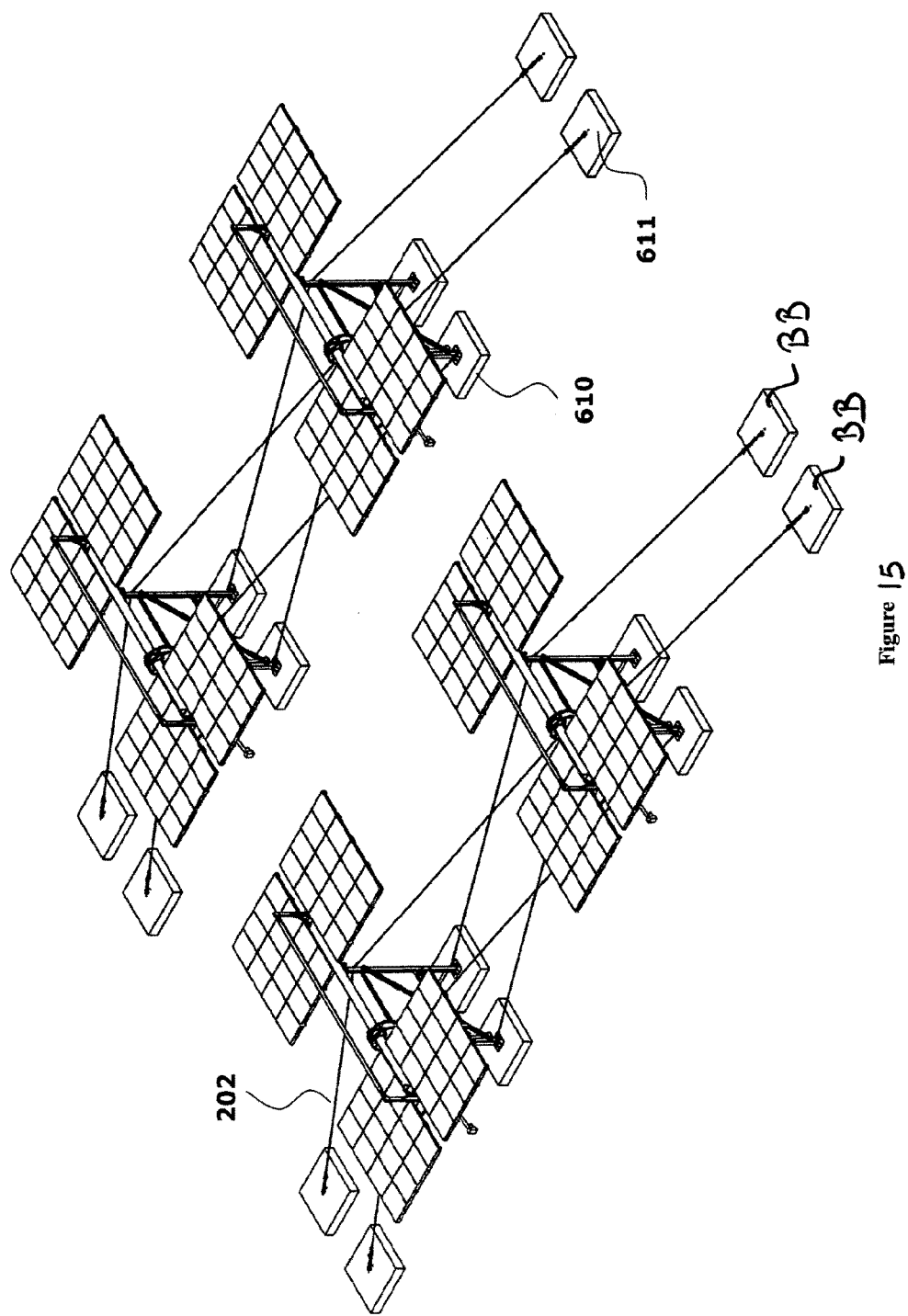
FIG. 15 illustrates a diagram of a preferable embodiment of an array of dual-axis concentrator photovoltaic solar tracker units which are mechanically cross-linked and mounted onto ballast blocks.

In another embodiment shown on FIG. 15 dual-axis concentrator photovoltaic solar tracker units which are mechanically cross-linked are mounted onto ballast blocks (BB).

Figure 3:
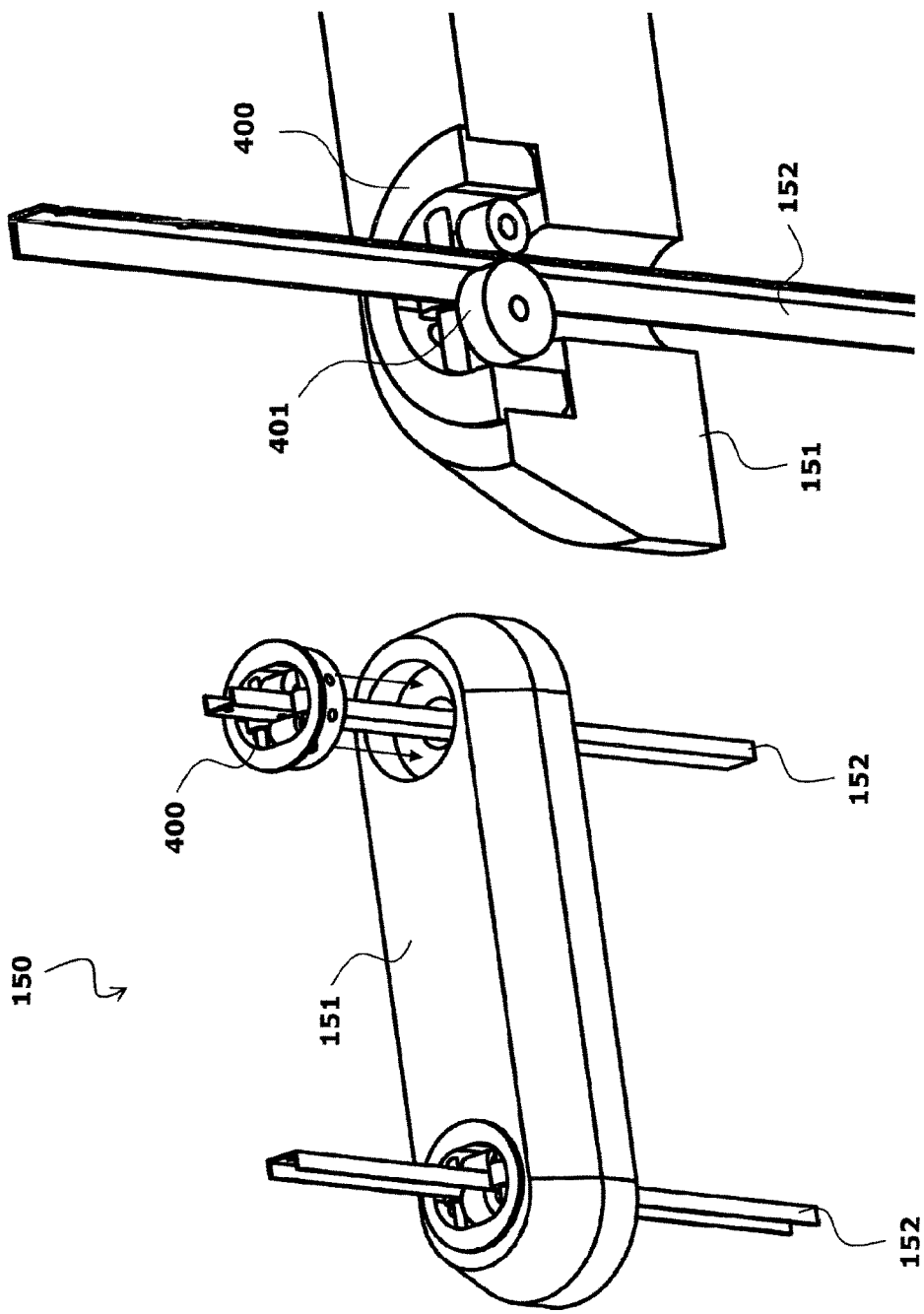
FIG. 3 illustrates a diagram of an embodiment of a fixture to guide the vertical posts of the herein disclosed tracker units of the invention through pre-cast blocks.

FIG. 3 illustrates a diagram of an embodiment of the anchoring basis.

The anchoring basis comprises at least a guiding fixture (400) which may be used to guide the pole's structure vertical posts (152) through hole-openings.

The anchoring basis described herein has two guiding fixture (400), one by posts, and is a pre-cast block (151).

The pre-cast block may be made out of concrete reinforced with organic fibers or steel.

The guiding fixture (400) comprises multiple rollers (401) to guide the vertical post (152) and accurately register its position relative to the pre-cast block (151).

The vertical posts (152) may be driven into the ground using standard pneumatic or hydraulic post driving equipment for installing regular flat plate PV panels onto fixed metal racks.

The posts, during the installing step of the posts onto the anchoring basis, comprise alignment fixtures.

After the at least two vertical posts are driven into the ground, the alignment fixtures may be removed.

The hole openings in the pre-cast block (151) may be back filled with anchor cement (low viscosity, typically fast settling) to permanently secure the vertical posts (152).

In a preferred embodiment, through metal bolts may be added to the vertical posts (within the sealed section area) in order to further improve the strength of this bond. This installation procedure offers multiple advantages over traditional installation procedures which have been previously used for installing single pole pedestal trackers or serial tracker arrays.

Unlike standard cast concrete foundations, the herein disclosed installation procedure only requires a tiny mass of cement to be mixed and cast in the field.

Use of pre-cast concrete simplifies field installation logistics as only a very small amount of water need to be brought on site and a large quantity of pre-cast block can be transported in a single transport operation and then stored on site during the entire installation period.

Concrete blocks can be more cost effectively pre-cast in large quantities inside a dedicated manufacturing plant which may use fully automated procedures. Moreover, pouring a large mass of concrete on site onto metal re-enforced foundations may lead to pole alignment angular errors unless additional fixtures are used to preserve the alignment of the metal re-enforcements.

As result, adjustable links typically comprising bolts and nuts are typically manually adjusted in the field to straighten tracker poles and correct foundation alignment issues.

Prior art installation procedures are labor intensive and typically require the use of skilled operators. As an extreme case, complex laser assisted alignment techniques are typically required for installing serial tracker arrays as these systems require very tight alignment tolerances over long distances.

In the case of the herein disclosed installation procedure, a very small mass of anchor cement is poured to seal the vertical posts driven which are straight into the ground.

Thus, the alignment of the vertical posts driven into the ground is not disturbed by this small mass of cement. The vertical posts can be driven straight into the ground with an angular accuracy of less than +/−2 degrees using appropriately guided pneumatic or hydraulic post driving equipment.

When CPV trackers are exposed to wind, large pressure forces are applied onto the array(s) of CPV modules supported by the tracker frame structures. These forces induce large moment forces on the tracker pole(s). The tracker pole(s) and foundations thus need to be appropriately sized in order to maintain the CPV modules precisely aligned to the sun.

In the herein disclosed novel tracker design, features are used to significantly reduce or eliminate these moment forces on the vertical poles and foundations.

Figure 3A:
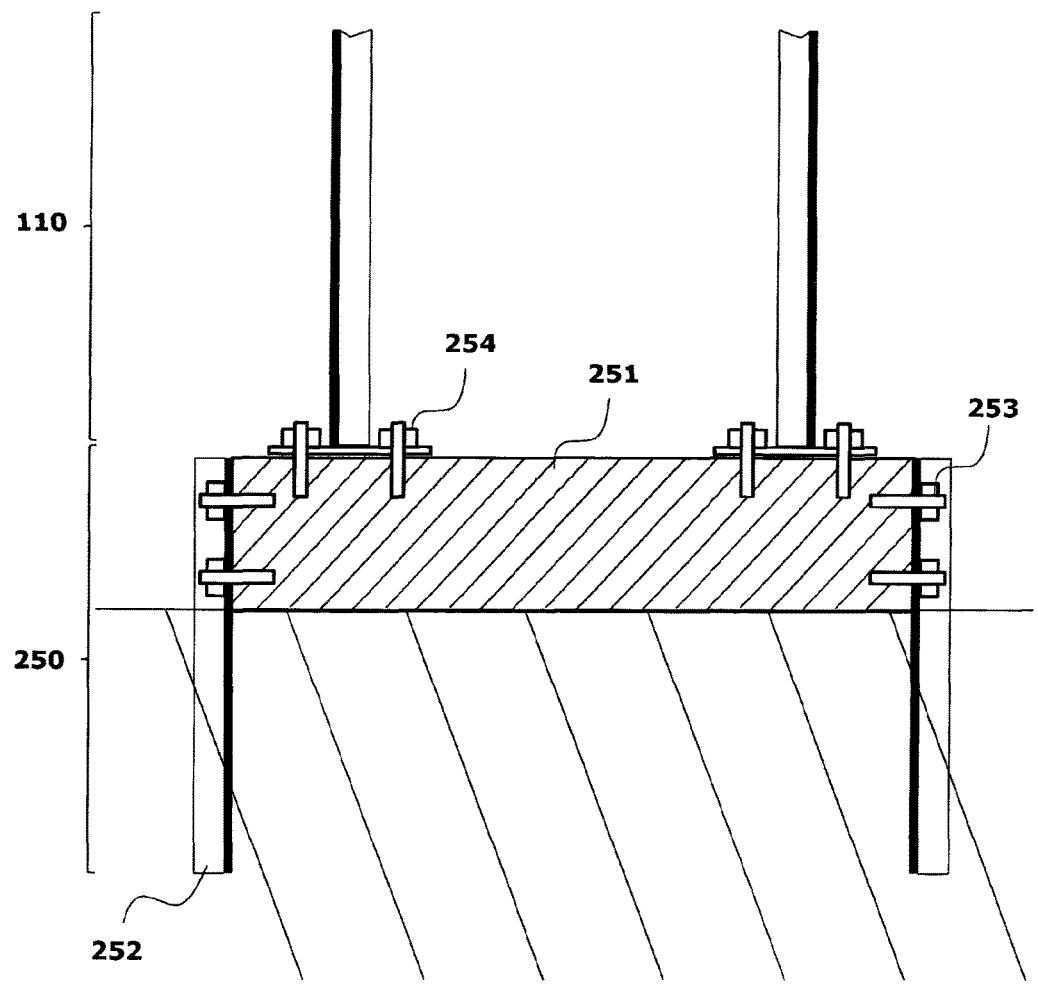
FIG. 3A illustrates a diagram of an embodiment of an hybrid ground anchor for the herein disclosed tracker units according to one embodiment of the invention.

FIG. 3A presents another embodiment of an hybrid ground anchor foundation solution comprising one or multiple vertical posts (252) secured, for instance bolted, to a pre-cast concrete block (251) using standard concrete fasteners such as concrete anchor bolts or metal inserts (253). The tracker pole structure (110) may be mechanically attached to the vertical posts (252) or fitted with an anchor plate (254) which can be secured, for instance bolted, onto the pre-cast concrete block (251).

Figure 4:
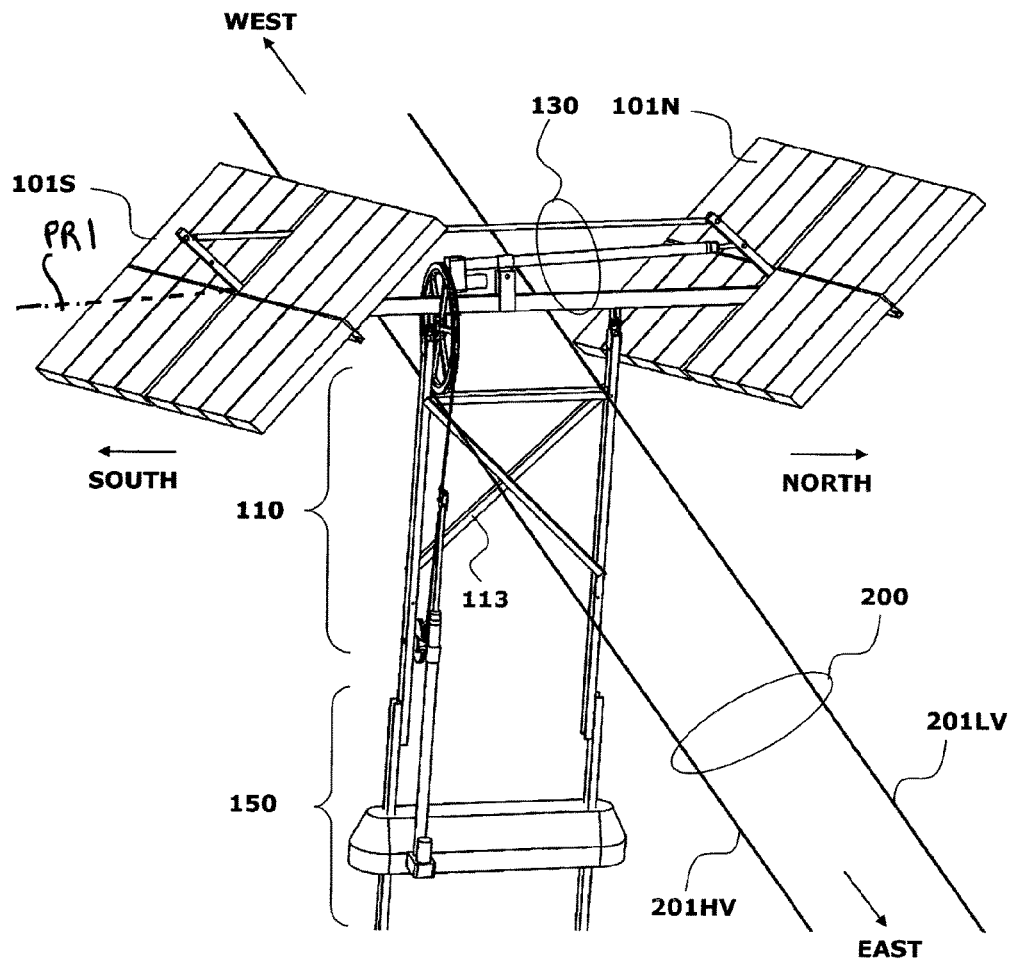
FIG. 4 illustrates a diagram of an embodiment of a dual-axis tracker unit comprising two vertical posts and a vertical pole structure comprising crossed metal beams.
Figure 12:
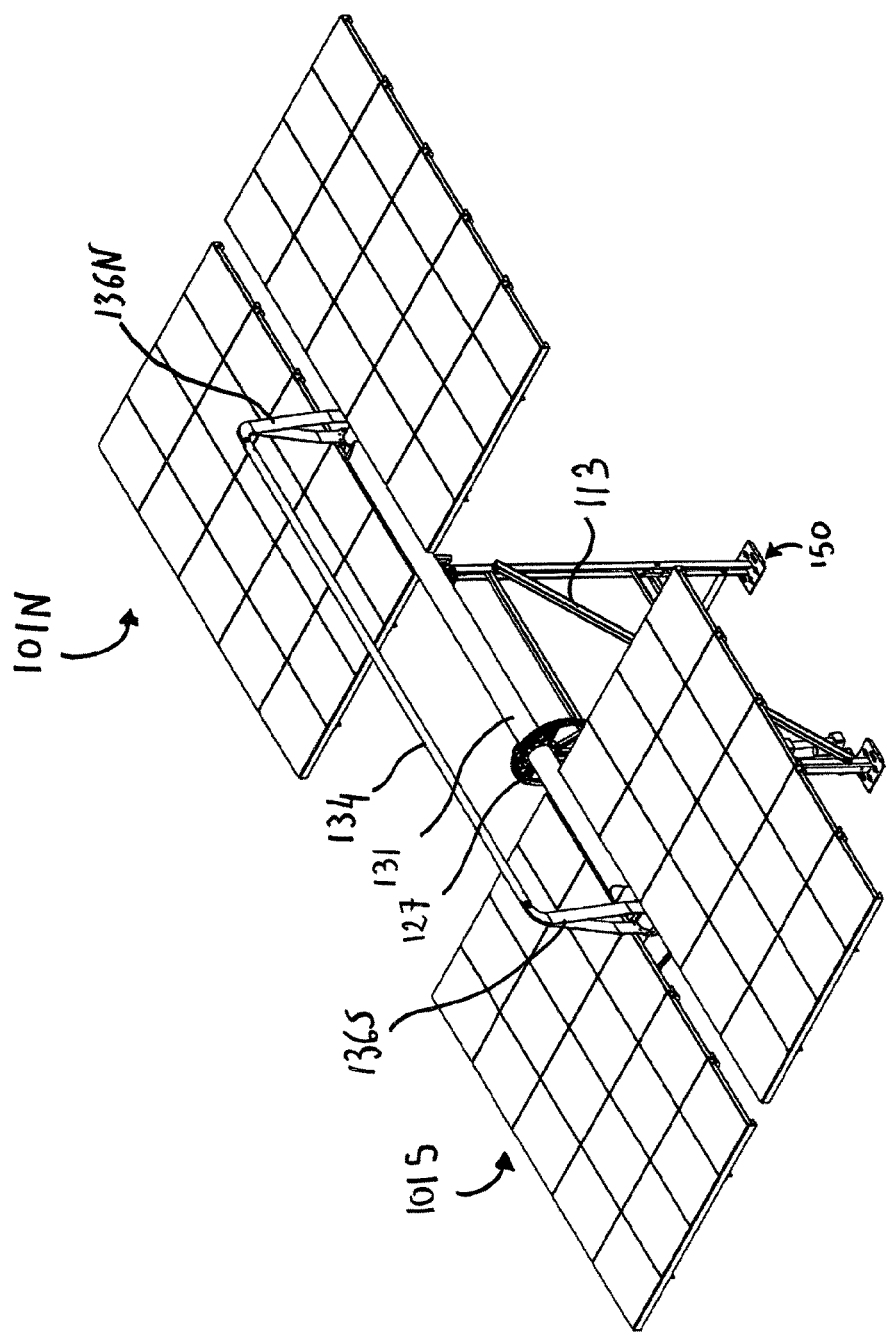
FIG. 12 illustrates a diagram of a preferable embodiment of a dual-axis tracker unit comprising two vertical posts and a vertical pole structure comprising crossed metal beams.
Figure 13:
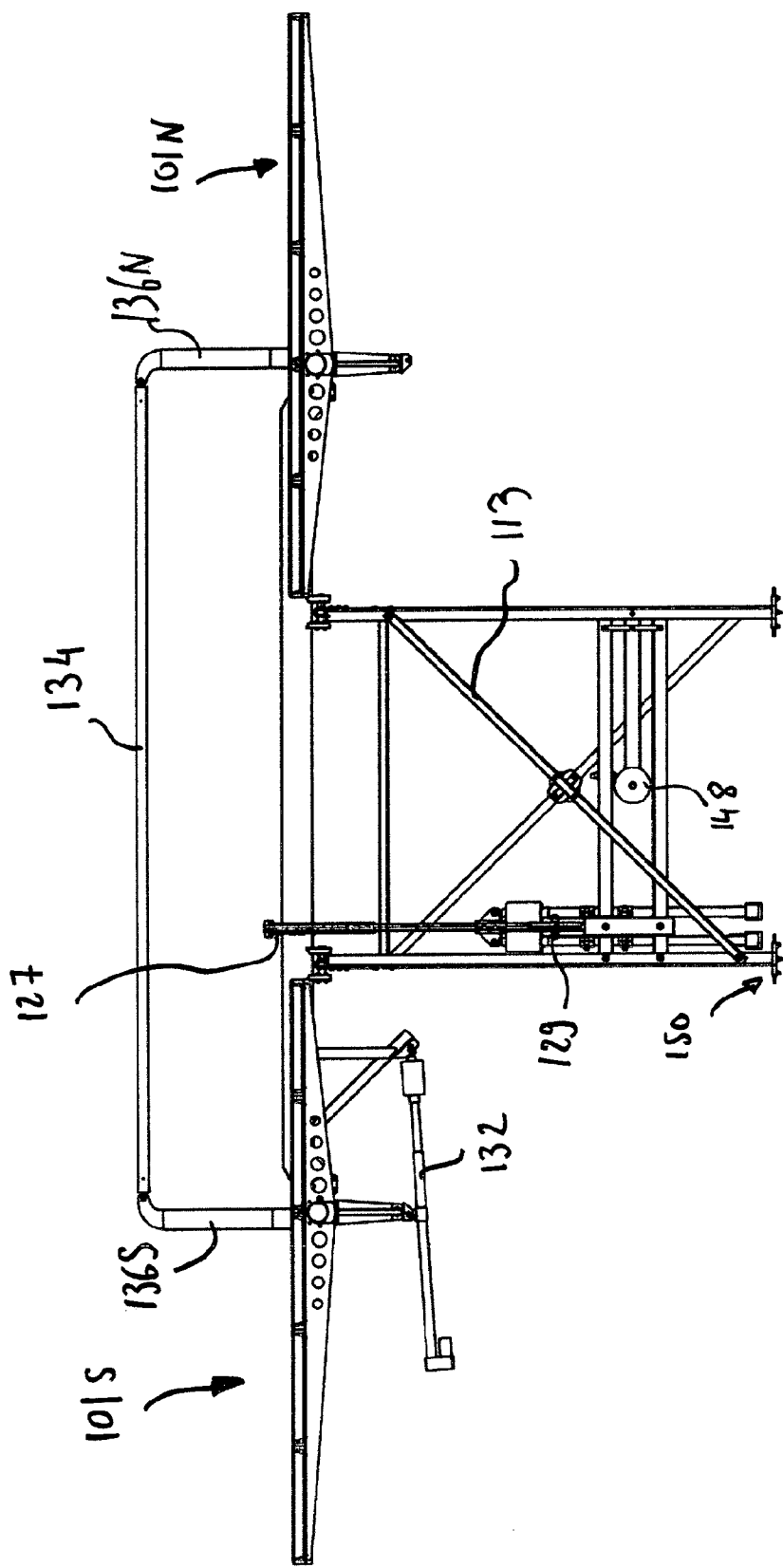
FIG. 13 illustrates a North-South oriented diagram of a preferable embodiment of a dual-axis tracker unit supporting two mechanically linked sub-frames populated with two sub-arrays of concentrated photovoltaic solar (CPV) modules rotating around a shared horizontal equatorial axis extending along a North-South direction.

FIGS. 4, 12 and 13 illustrate diagrams of embodiments of a tracker unit (100).

The tracker unit (100) comprises a secondary rotating means controlling the orientation of the sub-frames around corresponding secondary rotation axis of said sub-frames.

The secondary rotation axes are orthogonal to the primary rotation axis and are located at each end of the torque tube.

The actuators means are used for controlling the primary and the secondary rotating means for maintaining the array of photovoltaic modules aligned to the sun.

The actuators means of both primary and secondary rotating means are linear.

The pole structure is central with regard to the sub-frames.

This configuration takes advantage of the split frame into sub-frames configuration to enable the use of cross stiffening structural beams (113) and the tensioned wire ropes (200).

The combination of these two features notably permit a significant reduction of the mass of steel required to fabricate the tracker pole structure (110) and the mass of concrete required for the foundations (150).

The beams are cross linked by structural members defining substantially a plane including or parallel to the primary rotation axis The herein disclosed design enables the formation of triangular mechanical beam structures to effectively distribute wind forces onto separate points distributed onto the ground.

Such beam structure design practices have not been typically used for the fabrication of single pole pedestal trackers as the diameter of the central pole needs to be kept to a minimum in order to avoid mechanical interferences (as the tracker frame rotates around this vertical pole).

The herein disclosed split frame design frees up this mechanical clearance constrain and uniquely enables the use of cross stiffening structural beams (113) and tensioned wire ropes (200) to effectively counter wind forces along the North-South and East-West directions.

Figure 5:
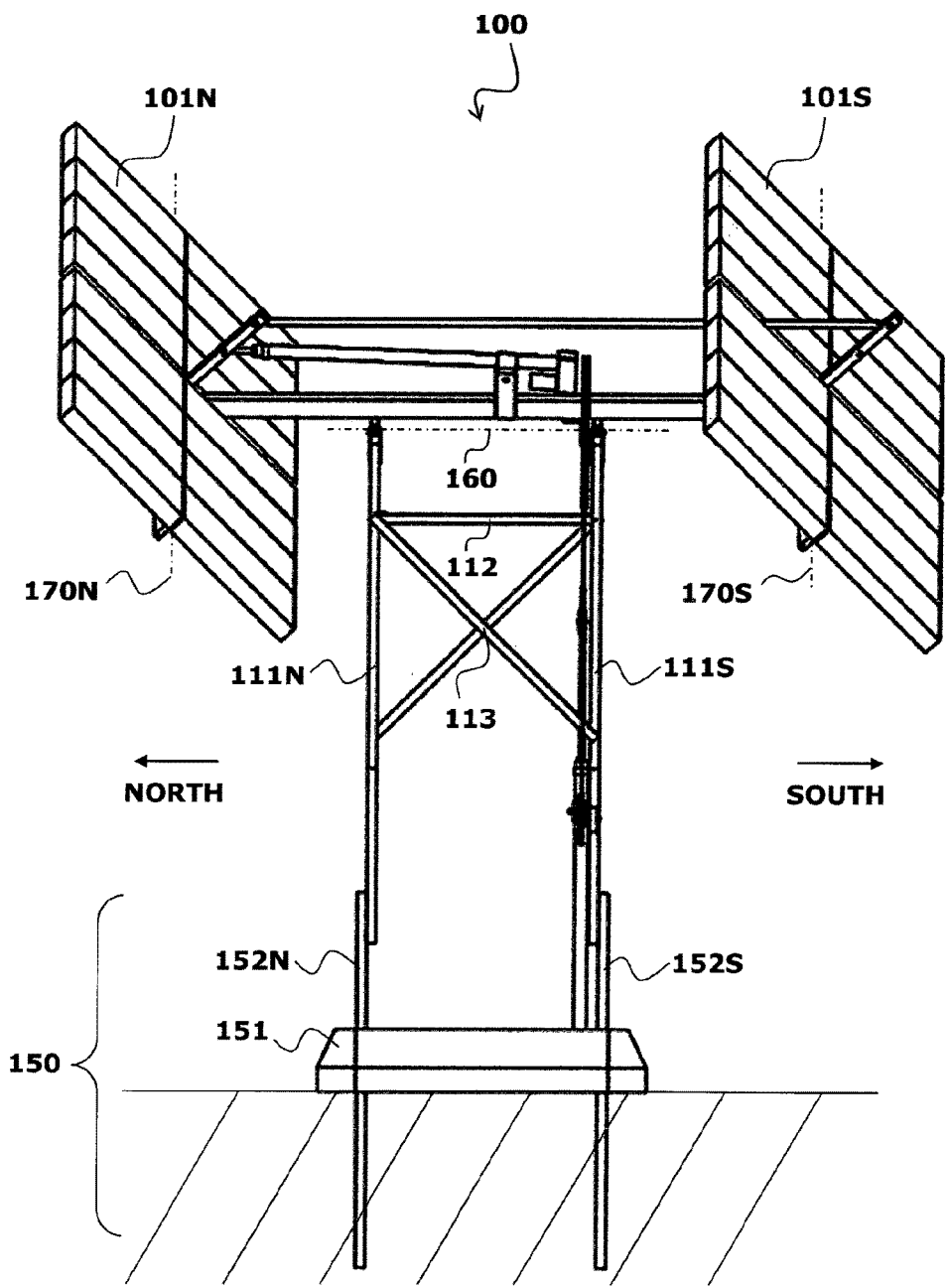
FIG. 5 illustrates a North-South oriented diagram of an embodiment of a dual-axis tracker unit supporting two mechanically linked sub-frames populated with two sub-arrays of concentrated photovoltaic solar (CPV) modules rotating around a shared horizontal equatorial axis extending along a North-South direction.
Figure 6:
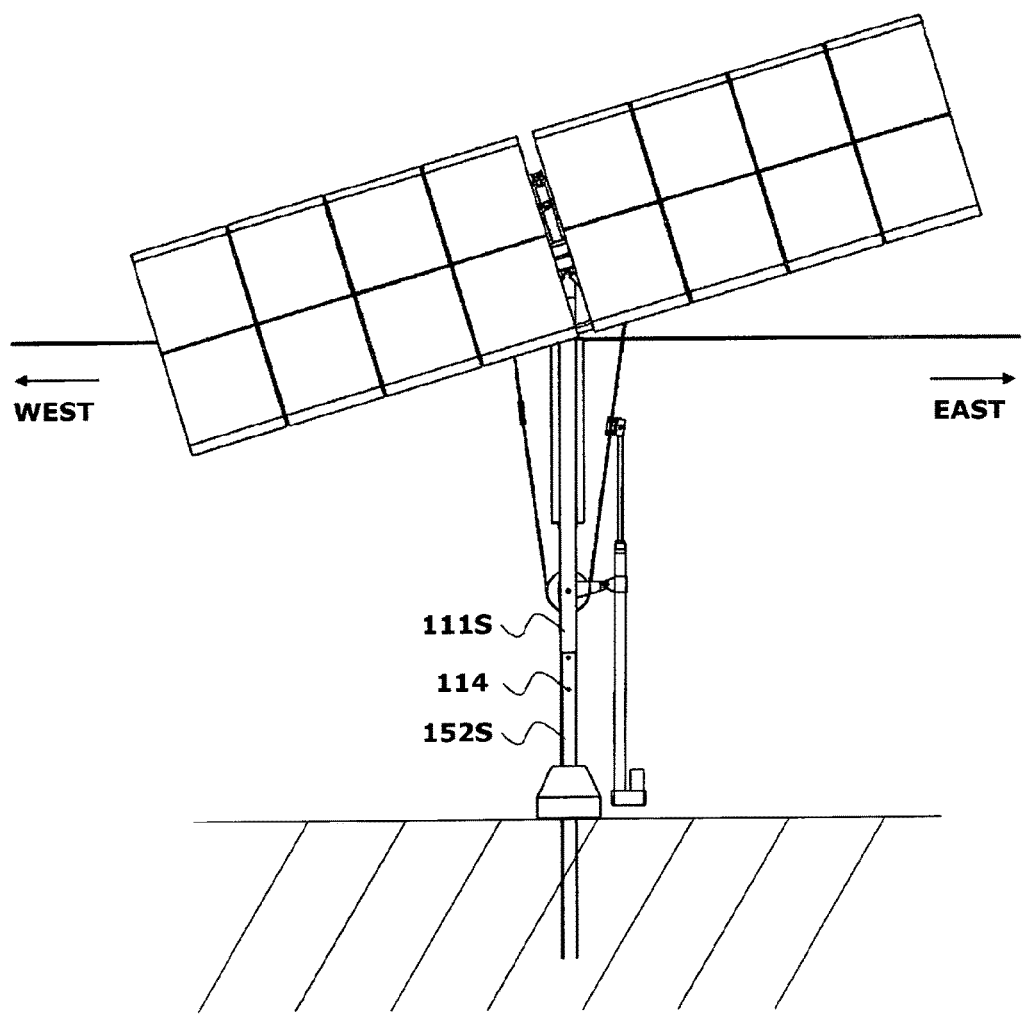
FIG. 6 illustrates an East-West oriented diagram of an embodiment of a dual-axis tracker unit supporting two mechanically linked sub-frames populated with two sub-arrays of concentrated photovoltaic solar (CPV) modules.

This herein disclosed embodiment of a single tracker unit (100) is further illustrated on a North-South oriented diagram in FIG. 5 and with an East-West oriented diagram in FIG. 6.

In an embodiment of the invention, the pole (110) of each tracker unit (100) may consists of two vertical posts or beams (111N & 111S), which may be attached to the foundation vertical poles (152N & 152S) using mechanical fasteners (114).

The vertical beams may be mechanically reinforced with horizontal (112) and cross (113) stiffening structural beams.

In an embodiment of the invention, each tracker unit (100) may support two mechanically linked sub-frames populated with two sub-arrays (101N & 101S) of photovoltaic modules rotating around a shared horizontal equatorial axis (160) extending along a North-South direction.

The horizontal equatorial axis is collinear to the primary longitudinal axis and offset from it of a determined distance which is typically greater than the radius of the torque tube (131). For instance the offset correspond to a distance equal to around 150% of the torque tube diameter.

In a preferred embodiment of the invention, the herein disclosed tracker unit is fully assembled in a factory prior to being installed in the field.

The herein disclosed tracker unit may be installed very quickly in the field as only few mechanical fasteners need to be tightened to mount each tracker unit on its foundation. (150).

Attachment of the herein disclosed cross-linking wire ropes (200) between the tracker units completes the mechanical work required to install a linear array of trackers.

Figure 7:
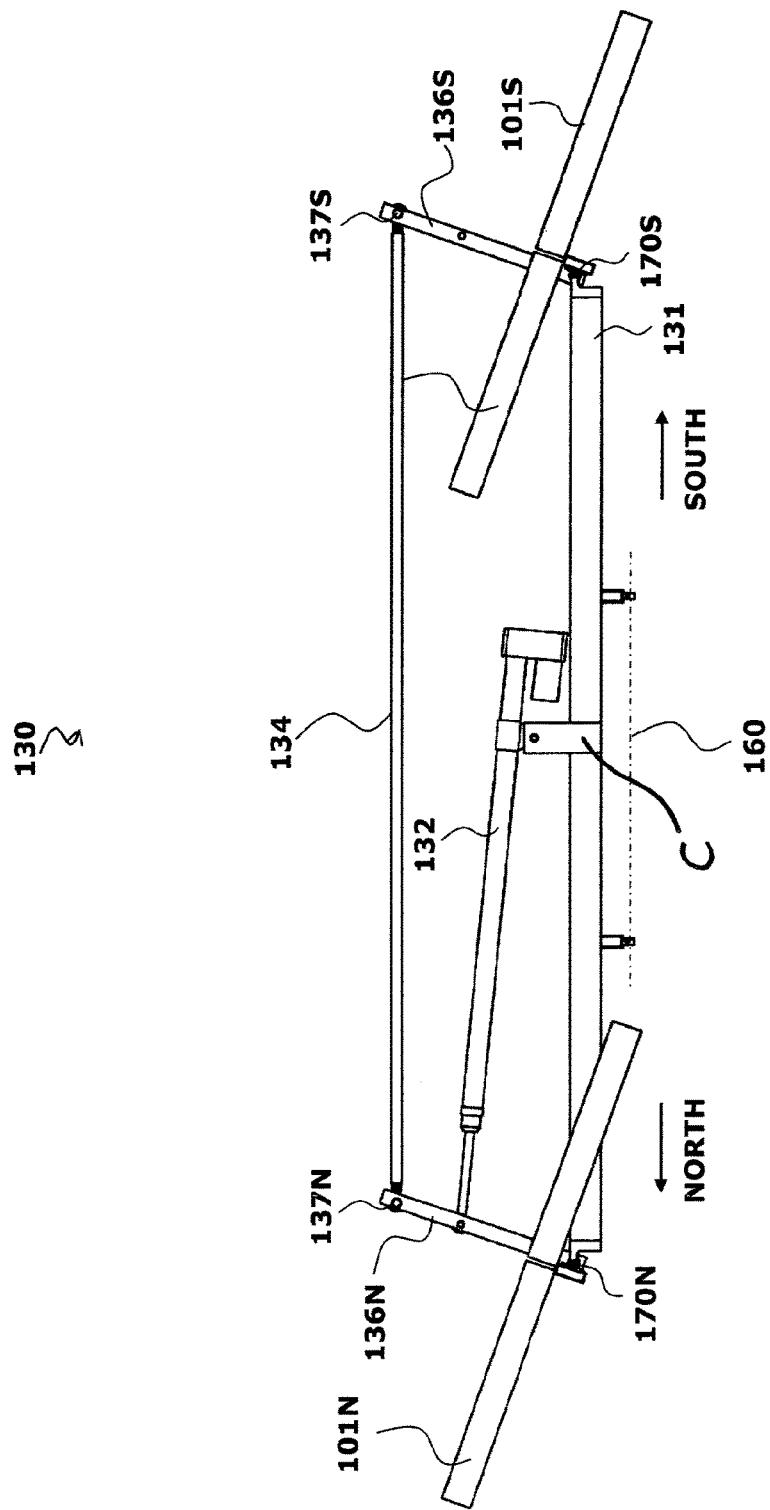
FIG. 7 illustrates a diagram of an embodiment of a structure comprising a pair of mechanically linked sub-arrays of CPV modules assembled onto sub-frames which are rotating in unison around two parallel tilt axes and a common equatorial axis.

FIG. 7 illustrates a diagram of an embodiment of the tracker upper structure (130) comprising a pair of mechanically linked sub-arrays (101N & 101S) of photovoltaic modules assembled onto sub-frames which are rotating in unison around the two second parallel tilt axis (170N and 170S) that are orthogonal to the common equatorial axis (160).

Mechanical arm structures (136N & 136S) terminated with pivot points (137N & 137S) are attached to each sub-frame.

A mechanical linkage rod (134) connect these pivot points (137N & 137S) to enable both sub-frames to rotate in unison around their respective tilt axis (170N and 170S).

During functioning this linkage rod is arranged to pass though the sub frame which are formed with a central slot authorizing the passage, rendering the sub frame movement between a quasi-horizontal position and a vertical or quasi vertical position The tilt axes (170N and 170S) are positioned at each end of the torque tube (131).

In an embodiment of the invention, a linear actuator (132) is attached between the common torque tube (131) and one of the sub-frame mechanical arm structure (136N).

The linear actuator is position above the torque tube (131) and connected to it by one of its end portion by a connection member (C). The connection member is at least longer than 2 cm and terminated by an articulation connected to the linear actuator.

This linear actuator drives the herein disclosed parallel coupling mechanism.

The mechanical linkage rod (134) preferably has an adjustable length in order to set the parallelism between the two sub-arrays of CPV modules (101N & 101S). The maximum tilt angular rotation required toward the North and South directly depends on the latitude of the tracker installation site, for instance less than 35° toward North and less than 70° toward South.

The maximum tilt angular rotation required toward the South corresponds to the sun elevation in the sky at winter solstice. The maximum tilt angular rotation required toward the North corresponds to the lowest sun azimuth angle at sunrise (or sunset).

Figure 8:
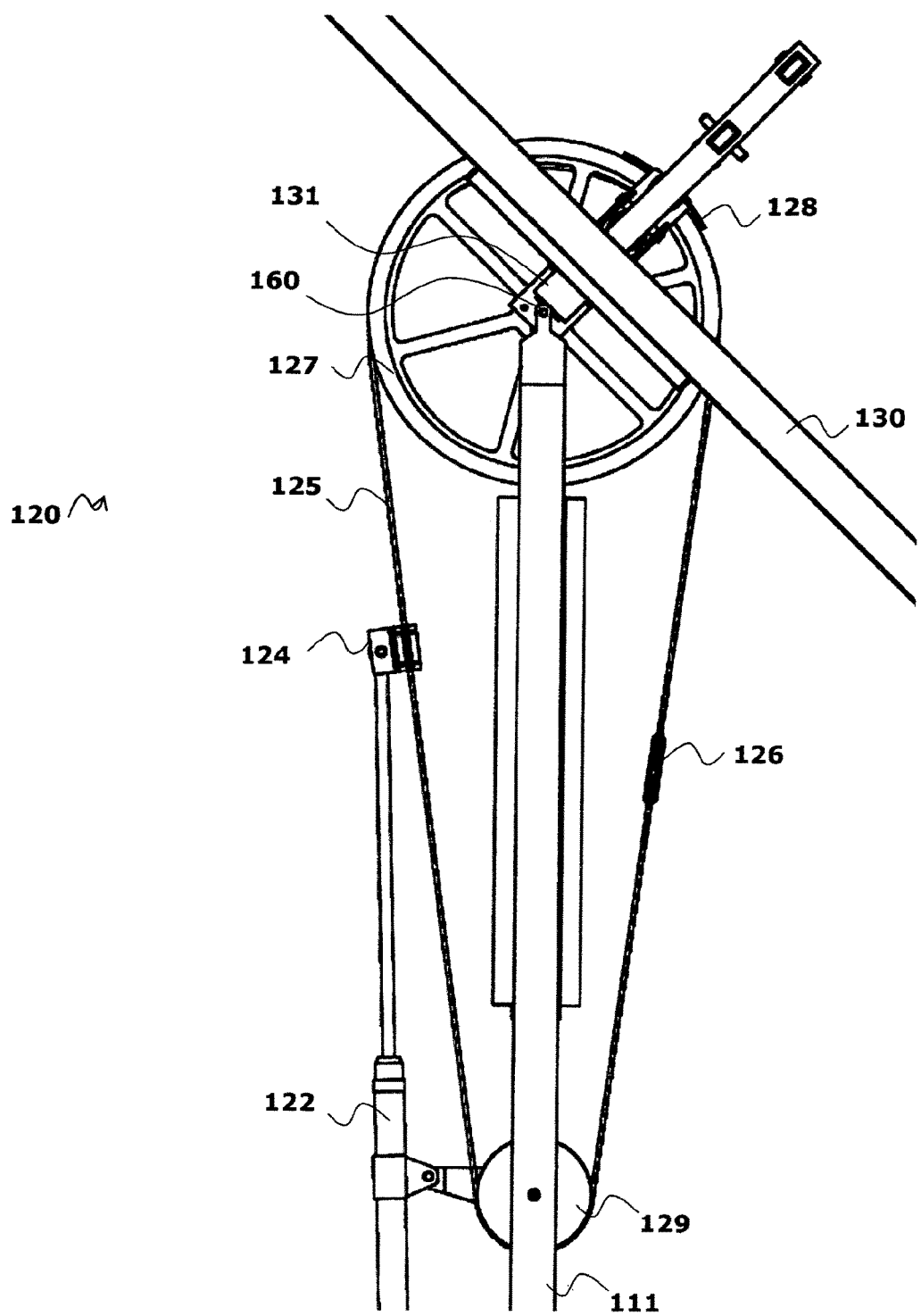
FIG. 8 illustrates a diagram of an embodiment of a high performance coupling mechanism converting linear motion of an actuator into rotation of CPV array assemblies around an equatorial axis.

FIG. 8 illustrates a diagram of an embodiment of a high performance coupling mechanism (120) which converts the linear motion of a linear actuator (122) into rotation around an equatorial axis (160) of sub-frame structures populated with two sub-arrays of photovoltaic modules (101). The linear displacement of linear actuator (122) is transferred to a wire rope (125) through a direct coupling fixture (124). The wire rope (125) could comprise more than one wire rope or strand. The wire rope (125) is wrapped around a first pulley (129) and a second pulley (127). The second pulley (or sheave) is rigidly coupled to a tracker unit torque tube (131) rotating around the equatorial axis (160). A spring or turnbuckle tensioning element (126) is used to keep the wire rope under tension at all time.

In an embodiment of the invention, each strands or wire rope is mechanically attached to the second pulley with a clamping fixture (128) in order to eliminate any risk of slippage. The herein described mechanism enables very efficient conversion of the linear motion of the linear actuator (122) into rotation of two sub-frames mechanically coupled to a common torque tube (131). The herein disclosed mechanism can be used to rotate an array of CPV modules (101) by +/−90 degrees.

Unlike more standard pivot coupling mechanisms, the herein described mechanism is highly efficient at transferring forces as the linear actuator remain parallel or mostly parallel to the wire rope (125) during its full stroke.

The diameter and tension of wire rope (125) of the herein disclosed invention can be appropriately adjusted to transfer large moment forces to the second pulley (127) which is driving the torque tube (131) and PV array (101) assemblies. In a further embodiment of the invention, the direct coupling fixture (124) can be guided by a linear guide in order to insure that the driven section of the wire rope (125) remains perfectly straight during the full stroke of the linear actuator (122).

Unlike more standard pivot coupling mechanisms, the herein described mechanism is highly efficient at transferring forces as the linear actuator remain mostly parallel to the wire rope (125) during its full stroke. Similar backlash free rotation coupling mechanisms have been previously used in other fields.

The diameter and tension of wire rope (125) of the herein disclosed invention can be appropriately adjusted to transfer large moment forces to the second pulley (127) which is driving the torque tube (131) and of the tracker upper structure (130).

In a further embodiment of the invention, the direct coupling fixture (124) can be guided by a linear guide in order to insure that the driven section of the wire rope (125) remains perfectly straight during the full stroke of the linear actuator (122).

Figure 9:
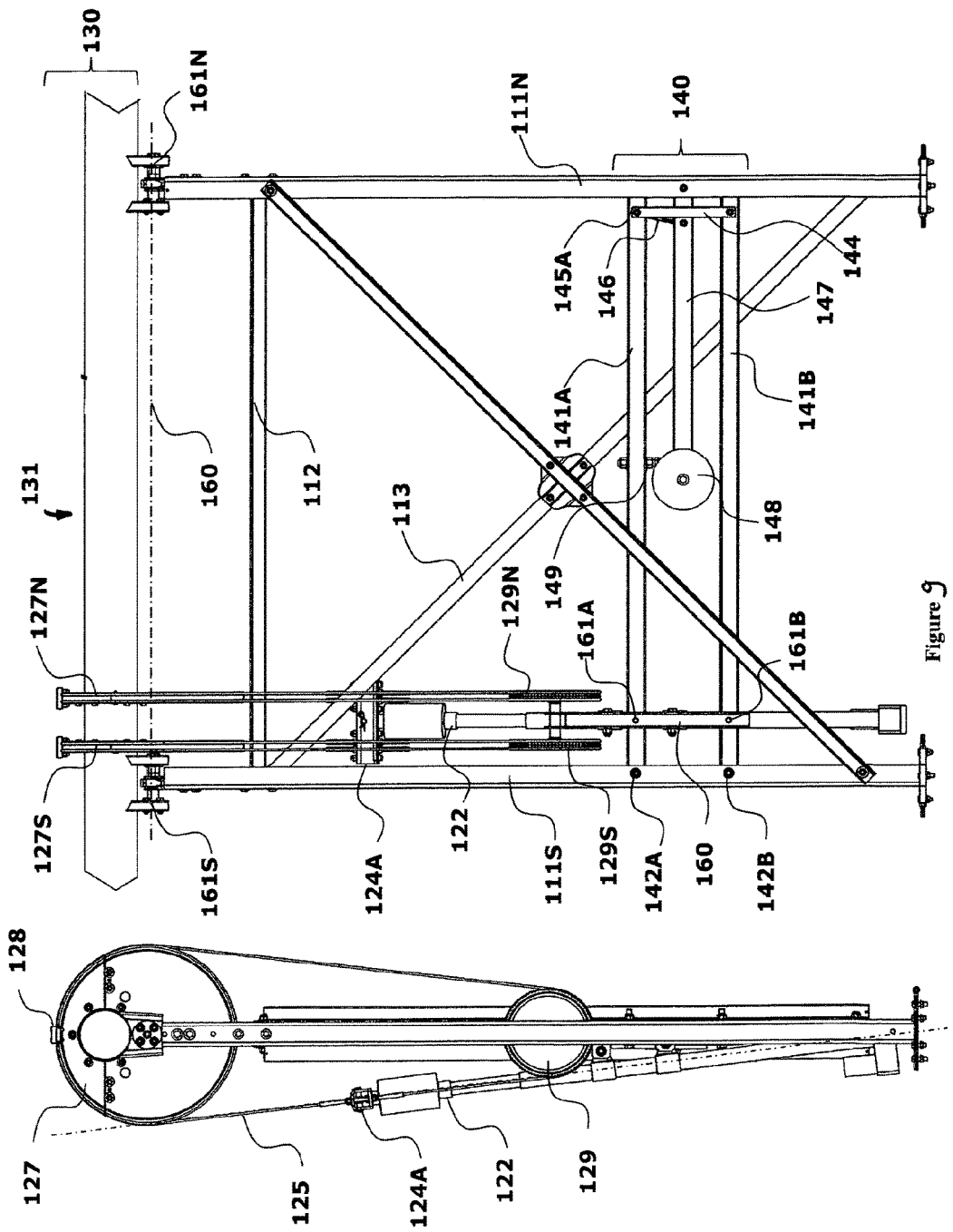
FIG. 9 illustrates a diagram of an other embodiment of a high performance coupling mechanism converting linear motion of a single linear actuator into rotation of CPV array assemblies around an equatorial axis. This coupling mechanism comprises two pairs of pulleys or sheaves, a single linear actuator and a constant load rope tensioning device.

FIG. 9 illustrates a diagram of an embodiment of a high performance coupling mechanism (120) which does not generate any off axis load and which converts the linear motion of a linear actuator (122) into rotation around an equatorial axis (160) of the tracker upper structure (130). This coupling mechanism comprises a pair (127) of top pulleys (127S & 127N) which are mechanically connected to the tracker upper structure (130) and a lower pair (129) of bottom pulleys (129S & 129N) which are connected to a connection fixture (160).

A single linear actuator (122) is connected by a wire rope coupling fixture (124A) to a pair of wire ropes (125) which are mechanically connected to the pair of top pulleys (129) with a clamping fixture (128).

In this embodiment, the linear actuator is positioned in the center plane located between the two pairs of pulleys and the rod of the actuator extend along an axis which is coincident with the plane crossing all the ropes (125).

In this embodiment, the entire force of the linear actuator is transferred directly to the ropes with no off axis loads. If the pivot points (161S & 161N) of the tracker upper structure (130) are not perfectly coaxial with the center axis of the pair of upper pulleys (127), the distance between the center axis of the pair of upper pulleys (127) and the center axis of the lower pulleys (129) will fluctuates when the tracker upper structure (130) rotates around the equatorial axis (160).

Moreover, manufacturing or temperature variations may induce changes of the length of the cables of the above listed high performance drive mechanisms of the invention.

If the drive mechanism comprises more than one wire, a load balancing mechanism should preferably be used in order to insure that each cable share the same tension force.

In order to maintain a constant tension in the ropes (125), the connection fixture (160) supporting the pair of lower pulleys (129) is connected to a constant load tensioning device (140).

The tensioning device includes the sheaves that are vertically installed with respect to each other.

The lower sheave is movable with respect to the other. The tensioning device includes means for adapting the distance between the sheaves so as to correspond to the eccentricity of the other pulley.

The eccentricity of the pulley is considered dynamically as the distance between the center of rotation of the upper pulley and the corresponding point on the pulley to the vertically apex of the cable. As an embodiment of the invention, the constant load tensioning device (140) may be composed of a mechanism relying on springs or a weight subjected to vertical gravity forces such as a leverage arm mounted in the pole structure and controlled by controlling means (not shown).

An exemplary embodiment of a weight based tensioning mechanism (140) is illustrated in the FIG. 9. This mechanism may comprises a pair of lever arms (141A & 141B) which are mechanically connected to the pole structure vertical members (111S & 111N) and the connection fixture (160) with two pairs of pivot points (142 & 161).

In order to limit the size of the dead weight (148) required to provide a sufficiently high tensioning force to the ropes (125), the tensioning mechanism (140) may comprise a third lever arm (147) mechanically connected to the structure vertical members (111S & 111N), the pole structure vertical member (111N) and the dead weight (148).

The wire(s) is pre-tensioned to a tension twice higher than the maximal tension than the actuator can undergo (and four times is there are two actuators).

The tension apply by the tensioning device is in excess of the pretension.

If the tension of the wire rope is too high, for instance due to the mechanical couple provided by the wind, the dead weight (148) will be moved naturally in contact to the lever arms (141A) that will stop it and block it. This provide as security function as this blockage can undergo far more tension than the wire itself.

Figure 10:
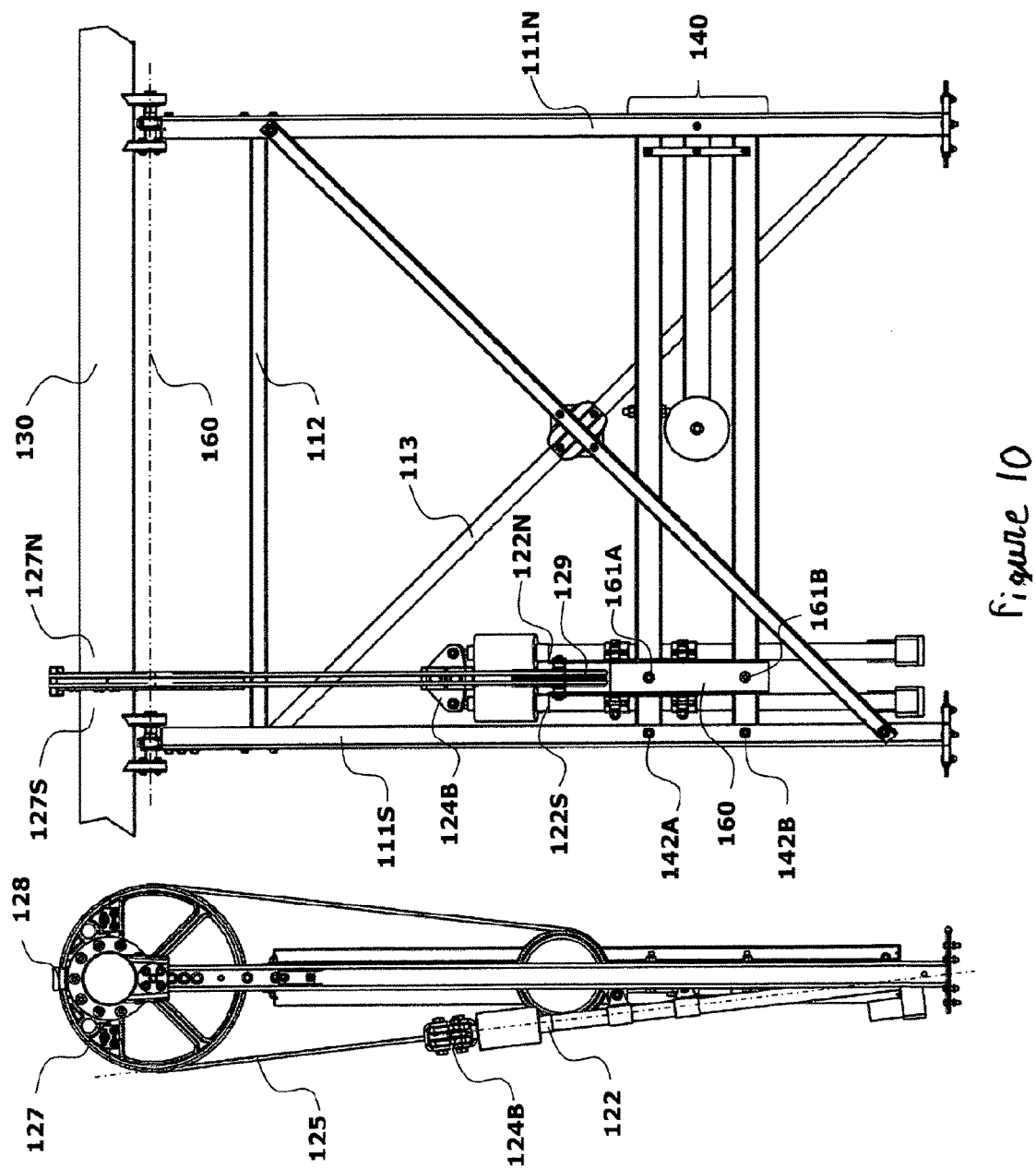
FIG. 10 illustrates a diagram of another preferable embodiment of a high performance coupling mechanism converting linear motion of a single linear actuator into rotation of CPV array assemblies around an equatorial axis. This coupling mechanism comprises a single pair of pulleys, two linear actuators and a constant load rope tensioning device.
Figure 11:
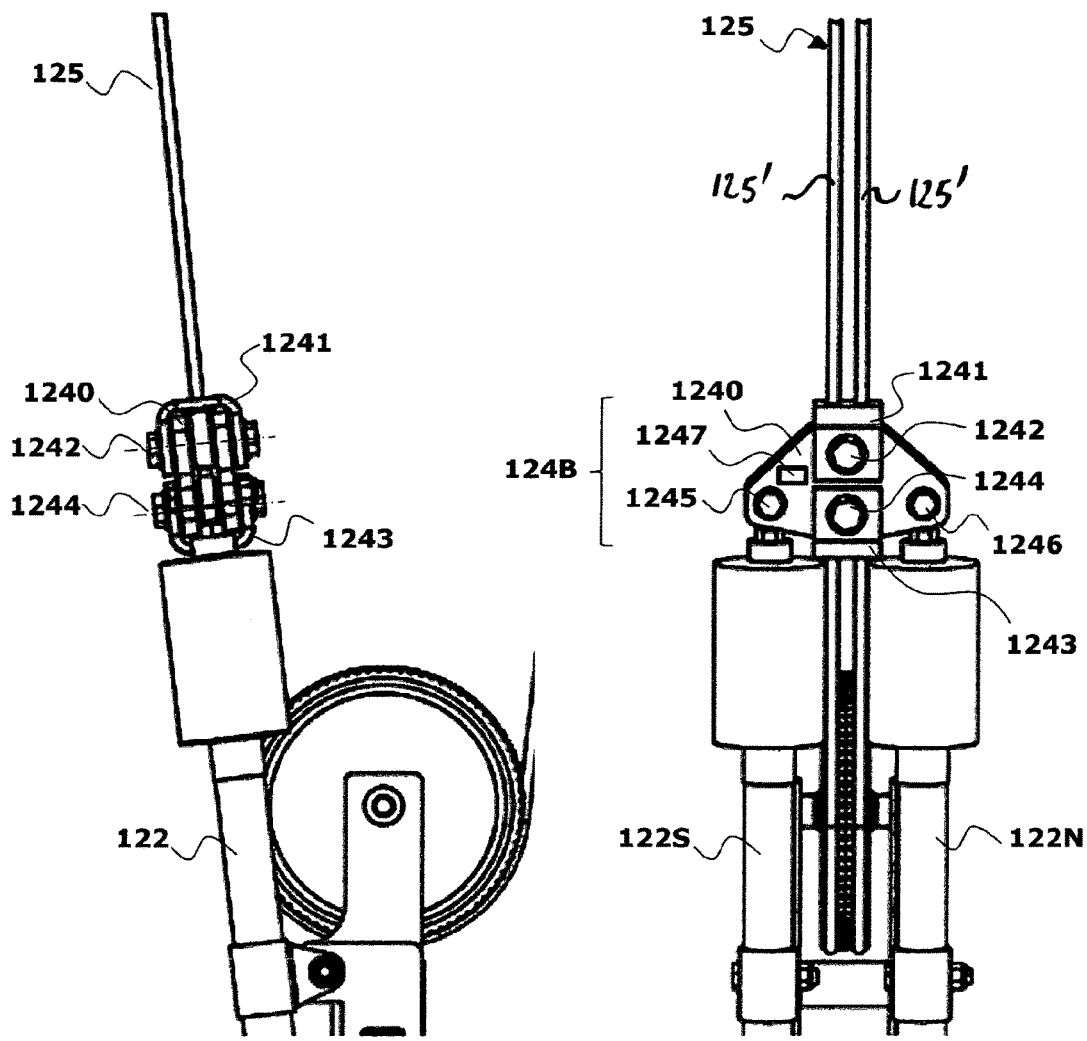
FIG. 11 illustrates a diagram of an embodiment of a load balancing mechanism to mechanically couple two linear actuators to a pair of ropes.

In another embodiment shown on FIGS. 10 and 11, the coupling mechanism comprises instead of two pairs of pulleys and a single linear actuator, a single pair of pulleys (127, 129) and two linear actuators (122S) and a constant load wire rope tensioning device.

The wire rope is a pair of wire ropes (125') as in FIG. 11, and the coupling mechanism comprises a wire coupling element (124B) for linking the two wire ropes. The pulleys are adapted with circular grooves for supporting two wires.

The linear actuators are sandwiching the second pulley. They are positioned in the direction of the motion of the wire rope and the second pulley is tangential to them.

The linear actuator or actuators for rotation of the sheave is (are) collinear or parallel with the first linear section of the wire rope.

The linear actuators are for instance jacks and particularly electrical jacks.

FIG. 11 illustrates an exemplary embodiment of a load balancing mechanism (124B) which may be used to equalize the load between two cables.

This load balancing mechanism (124B) may comprise a first fixture (1241) connected to the first end of the cables (125) and a second fixture (1243) connected to the other end of the cables (125).

Both fixtures (1241 & 1243) may be connected to a common single or pair of linkage plates (1240) with pivot points (1242 & 1244) to provide a mean for mechanically equalizing forces on each cable.

The common linkage plate(s) (1240) may be connected to the rod-ends of 2 linear actuators (122S & 122N).

The two linear actuators need to be properly synchronized to insure that this mechanism operates properly. The common plate(s) (1240) may be fitted with a tilt sensor in order to increase the overall safety of this mechanism and prevent a mechanical crash of the two actuators. Using the same principals, a similar load balancing mechanism comprising additional pivot points may be used to equalize tension loads among additional pairs of cables.

The herein disclosed rotation coupling mechanisms present some advantages over standard slewing ring actuators as these slewing ring actuators are typically 5 to 10 time more expensive to manufacture than their equivalent (from a torque load standpoint) linear actuator counterpart.

Slewing ring actuators require complex and time consuming three dimensional machining operations with excellent surface finish quality in order to achieve a low backlash operation.

Moreover, unlike slewing rings, linear actuators do not need to be lubricated once a year. Linear actuators relying on the use of ball screws require no maintenance as the ball screw provides very minimal friction and me be lubricated for the service life of the tracker unit (typically designed to exceed 25 years). Linear actuators also provide another advantage from a maintenance standpoint as these units can be very simply replaced in the field while standard pole trackers need to be disassembled in order to replace slewing rings or gear box type drives.

The actuators of dual axis CPV trackers are typically driven with electronic controllers which are traditionally mounted onto each tracker pole. Typically, one controller is used to control one tracker.

However, when a CPV tracker consists of a large number of distributed tracker units, it may be advantageous from a cost standpoint to use a different architecture.

Figure 14:
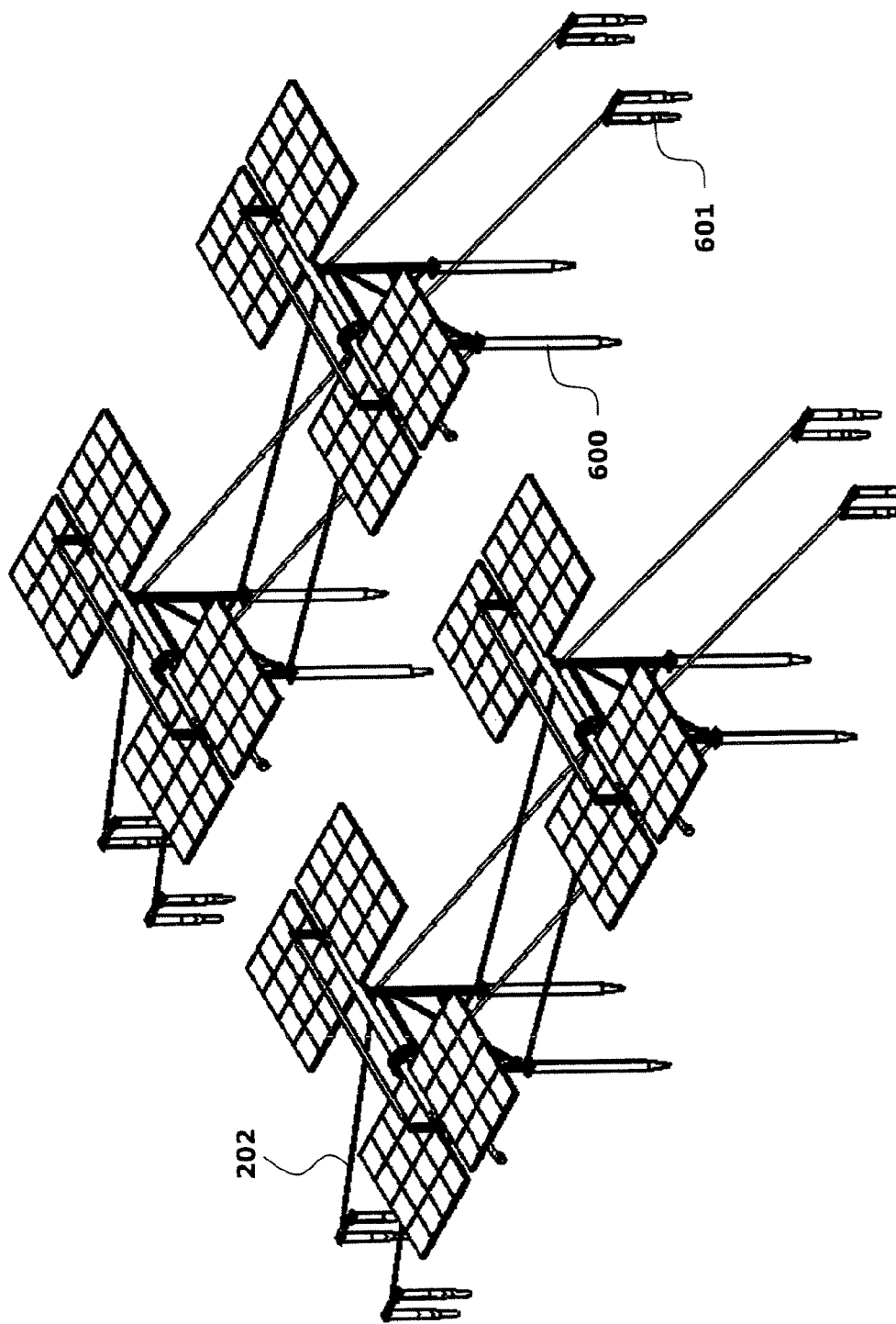
FIG. 14 illustrates a diagram of a preferable embodiment of an array of dual-axis concentrator photovoltaic solar tracker units which are mechanically cross-linked and mounted onto ground screw foundations.

FIGS. 13 and 14 provide schematic illustrations of an embodiment of a tracker unit of the invention which comprises one of the embodiment of the above disclosed high performance rotation drive mechanism.

The tracker units maybe be installed in an array arrangement comprising multiple rows of units which are mechanically cross linked with wire ropes (202) in order to reduce the cost of the foundations.

FIG. 15 provides a schematic illustration of an array of 2×2 tracker units installed on ground screw anchors (600 & 601).

Figure 16:
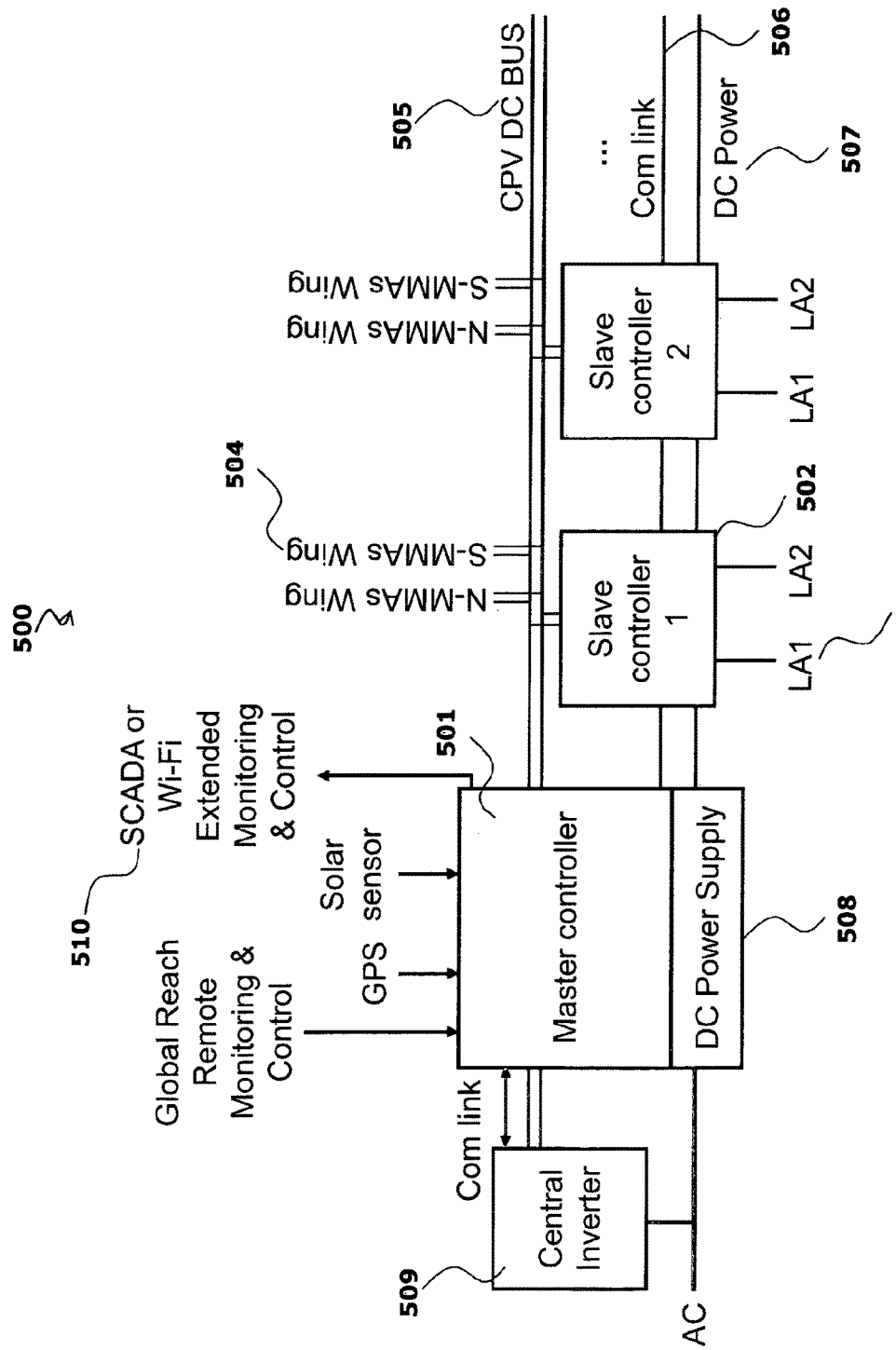
FIG. 16 illustrates an electrical schematic of an embodiment of an array of two-axis tracker units relying on distributed control architecture.

FIG. 16 provides a schematic illustration of an array of 2×2 tracker units installed on small ballast blocks (610 & 611) which may be made out of concrete.

In another embodiment of the invention, the ballast blocks may be made out of steel anchor plates which may be buried in the ground.

The anchor points at the end of each row of tracker units may use standard ground anchors which are typically used in the field of telecommunication towers.

FIG. 16 illustrates an electrical schematic of an embodiment of a distributed control architecture (500) relying on the use of a single master (501) and multiple slave (504) controller units driving an array of two-axis tracker units.

The master controller (501) is equipped with calculating means such as micro-processor to perform all the complex floating point math calculations, time synchronization, solar radiation flux monitoring, and external communications.

The master controller rely for instance on the use of a 32-bit RISC ARM processor cores which are for example used in the i.MX family of microprocessors (as manufactured by the company Freescale Semiconductor).

The motion trajectories commands are sent to each tracker units which are individually equipped with lower cost slave controllers (503). These motions commands are sent through a wired or wireless communication link (506). Each slave controller only requires a very basic micro-controller, such as an 8-bit microcontroller from the HC08 family (as manufactured by the company Freescale Semiconductor), to receive and process the motion commands received from the master controller (501) and then drive the two linear actuators (503) of their allocated tracker unit.

The actuators may consist of linear actuators from the CASD line of solar linear actuators as those manufactured by the company SKF. In an embodiment of the invention, the CPV module arrays (504) of each tracker unit are connected in a parallel manner onto a common high voltage continuous current (DC) bus (505) which is connected to a central inverter (509).

The central inverter may consist of a solar inverter with or without transformers from the family of inverters as manufactured by the company SMA. In a preferred embodiment of the invention, each slave controller (502) is equipped with sensors to monitor in real time the current and voltage generated by the CPV or PV module arrays (504) of each tracker unit.

For example, the voltage output of an array of CPV or PV modules may be scaled down using a resistive voltage divider bridge and then converted to a proportional numeric value through the use of an analog to digital converter circuit.

The current output of an array of CPV or PV modules may be measured using a hall effect-based linear current sensor integrated circuit, such as the ACS714 family of automotive grade sensors as manufactured by the company Allegro. The measured current and voltage values are sent back, to the master controller (501) which can use this information to optimize the pointing accuracy of each tracker unit.

The extended monitoring and control facility (510) allows tracker system users and technicians to remotely monitor the tracker arrays or specific tracker sets of the invention and related alarms, using a SCADA network, wi-fi network or other link. The remote monitoring and control facility over the Internet or over wireless networks will allow those concerned to have global reach monitoring and control (601) of the tracker array system and its specific tracker sets. Key parameters of the entire tracker array or individual tracker sets can be viewed with a convenient graphical interface depicting the system with all its key elements and any alarms.

To illustrate, a local computer or multiple computers can be used over a SCADA or Wi-Fi network to provide extended monitoring and control.

If the Internet is used for remote monitoring and control, an IP address is entered in an Internet browser of a remote computer, followed by a password. The specific password determines how much access the viewer has for making adjustments.

In one illustrative configuration of the extended or remote monitoring and control system, a graphical presentation is shown of the total system in operation with related alarms.

Also, a graphical presentation would be available of selected tracker sets and their related alarms. The key parameters of the system or tracker sets viewed are indicated with current values. A table is added to show the settings of the system or specific tracker set to quickly determine deviations from settings.

In another view selected from the main menu, historical charts of the various readings of the system or tracker sets are shown by periods to analyze historical performance.

A further view selected from the main menu allows those authorized to make adjustments to various adjustable components of the overall system or individual tracker sets.

Normally, the trackers would be fully automated and not need any special adjustments. However, in times of overloads, storms, abnormal conditions, alarms or testing, adjustments can be made by those authorized.

Central inverters are typically less expensive to manufacture and to service in the field then multiple smaller scale inverters.

When centralized inverters are used, separate AC and DC electrical ropes must be routed inside separate conduits to each CPV tracker.

The cost associated with the installation of these conduits and the extra DC wires, combiner boxes, breakers and surge protectors can represent a significant fraction of the balance of system (BOS) cost. Tradeoffs must thus be made with either design choice resulting in a non-optimum installation costs.

In the herein disclosed distributed control architecture (500), a single low cost continuous current (DC) power supply (508) is used to power a linear array of slave controller units (502) through the use of a low voltage DC power bus (507).

As a result, no AC wires need to be routed to each tracker unit and only one DC power supply is required to drive a large number of actuators.

In a preferred embodiment of the invention, the centralized DC power supply (508) is appropriately sized to drive two actuators as the tracker units can be driven in a synchronous manner. A backup battery may be installed in parallel with the centralized power supply in order to insure that the tracker units can be driven into a safe stow position in case of loss of the grid (AC) power.

In a preferred embodiment of the invention, the high voltage common CPV DC bus (505) and lower voltage bus (507+optionally 506) are separately attached to the horizontal wire ropes (FIG. 2, 201HV & 201LV) mechanically linking the tracker units.

This solution is highly advantageous from a cost standpoint over running these ropes into rigid conduits which are typically run on the installation site ground surface or buried under ground.

In yet another embodiment of the invention, the communication link (506) may be combined with the DC power bus (507) to communicate data via a power line communication (PLC) solution.

All the herein mentioned buses are attached to or supported by a stay of said tracker unit which defines housing for said electrical bus which is then connected to the master controller.

In an embodiment the system comprises at least a wind gauge (not shown) connected to at least the master controller.

The wind gauge acquires the wind intensity and sends the information to the master controller.

The current and voltage output of the arrays of photovoltaic modules supported by each sub-frame of said tracker units is monitored and/or measured by each slave microcontroller to which they are connected to.

The master controller optimizes and commands accordingly the trajectory of each tracker unit in order to maximize their power output if the wind intensity is under a determined threshold, and commanding each tracker unit to move to a predetermined safety position if the wind intensity is above a determined threshold.

Thereafter it will be described a method of installing a tracker according to one embodiment of the invention.

For installing at least a tracker, once the site has been selected, the user will install pre-cast concrete blocks. In one embodiment the concrete blocks is constituted of one single block.

The concrete blocks are substantially parallelepipedic and have a mass for example of two times 500 kg for a photovoltaic surface of the tracker around 20 m².

The site could be a ground area or any substantially flat and relatively sunny surface such as a roof of building or industrial building onto ground areas.

"Substantially flat" refers to a surface slope less than 15° degrees.

Structural steel profiles may be driven into the earth ground and secured to the pre-cast concrete blocks.

The securing step could be achieved by fastening the structural steel profiles to said pre-cast concrete blocks to form the anchor basis of the tracker unit.

In one of the embodiments the blocks comprises a minimum of two vertical passing through hole openings.

A guiding fixtures comprising roller elements are installed into the hole openings of each pre-cast concrete block.

The structural steel profiles are driven using the guiding fixtures.

Once done the guiding fixtures are removed by sliding them along the steel profiles.

Then the hole openings of said pre-cast concrete blocks have cement poured into to secure the steel profiles, to form the anchor basis of the tracker unit.

Once the anchorage has been done, the pole structure in placed on horizontally and between the elements of said anchor basis and is fixed rotatively to it.

This can be done by hinges pre-assembled on the blocks. For instance the hinge is bolted to said block by a panel of the hinge one side of the joint, and the second panel is connected to the pole structure.

The pole structure and the hinge are adjusted. The hinge is then bolted to the block (for example also through the first panels).

Each sub-frame supporting half of said array of photovoltaic modules is fixed to each end to the torque tube.

The pole structure is elevated by rotation after fixation of it to the extremity of the stays on said elements of anchor basis, Finally the tracker unit is fixated in place.

In summary, the herein disclosed distributed architecture (500) enables a significant reduction of the overall control system manufacturing and installation costs.

For the present description it should be understand that "Concentrated photovoltaic" describes a system that concentrates [electromagnetic radiation/sunlight] from the sun to a spot with irradiance greater than 1000 W/m² and generates electrical power from the resulting concentrated [electromagnetic radiation].

"Acceptance angle" refers to the half of the angular aperture of the concentrator photovoltaic module. Within this angular aperture operating range, the concentrator module electrical power output must remain higher than 90% of its maximum operating power.

"High-concentration" refers to a local electromagnetic irradiance of more than 200 kW/m².

All reference throughout this application, for example patent documents including issued or granted patents or equivalents; patent application publications; unpublished patent applications; and non patent literature documents or other source material; are herein incorporated by reference herein in their entireties, as though individually incorporated by reference, to the extend each reference is at least partially not inconsistent with the disclosure in this application (for example, a reference that is partially inconsistent is incorporated by reference except for the partially inconsistent portion of the reference).

The invention has been described with reference to various specific and preferred embodiments and techniques. However, it should be understood that variations and modifications may be made while remaining within the spirit and the scope of the invention. This invention is not to be limited by the embodiments disclosed, including any shown in the drawings or exemplified in the specification, which are given by way of example or illustration and not of limitation. The scope of the invention shall only be limited by the claims.

The invention claimed is:

1. A tracking photovoltaic solar system comprising at least a dual axis tracker unit maintaining an array of photovoltaic modules aligned to the sun during the course of the day, wherein said tracker unit includes:
   a pair of sub-frames, each sub-frame supporting half of said array of photovoltaic modules,
   a primary torque tube for supporting said sub-frames,
   primary rotating means for rotating said torque tube around a primary rotation axis,
   a pole structure fixed and extending vertically above an anchoring basis, said pole structure being rotatively connected to said torque tube,
   secondary rotating means controlling the orientation of said sub-frames around respective secondary rotation axes of said sub-frames, said secondary rotation axes being orthogonal to said primary rotation axis and a first linear actuator for controlling said primary rotating means and a second linear actuator for controlling said secondary rotating means for maintaining the array of photovoltaic modules aligned to the sun,
   wherein the torque tube has two ends, said secondary rotation axes are located one at each end of said torque tube, said pole, structure being central with regard to said sub-frames,
   wherein the primary rotating means comprises at least one pair of sheaves comprising a first sheave and a second sheave linked by a wire rope, wherein the first sheave is mechanically attached to the torque tube and wherein said wire rope is arranged to transfer the linear motion of said first linear actuator into rotation of said first sheave around the primary rotation axis of said tracker unit,
   wherein said first and second sheaves are vertically installed and movable with respect to each other, and further comprising tensioning means for adapting the distance between the first sheave and the second sheave.

2. The tracking photovoltaic solar system according to claim 1, wherein the pole structure comprises at least two elements vertically supporting the torque tube and wherein said first linear actuator for controlling said primary rotating means is mounted on said pole structure.

3. The tracking photovoltaic solar system according to claim 2, wherein said at least two elements comprise two vertical beams which are cross linked by structural members defining a plane including or parallel to the primary rotation axis.

4. The tracking photovoltaic solar system according to claim 1, wherein the pole structure defines a plane parallel to or including the torque tube, wherein said system comprises a set of stays attached to the pole structure and extending in planes orthogonal to the plane defined by the pole structure, said planes of the set of stays forming an angle relative to a surface of the ground of between 20° and 70°.

5. The tracking photovoltaic solar system according to claim 1, wherein said torque tube extends along a longitudinal axis, wherein the primary rotation axis of the primary rotating means is offset from said longitudinal axis of the torque tube.

6. The tracking photovoltaic solar system according to claim 1, wherein the first linear actuator for rotation of the first sheave is collinear or parallel to a first linear section of the wire rope.

7. The tracking photovoltaic solar system according to claim 6, wherein the first linear actuator for rotation of the first sheaves comprises two electric jacks disposed on each side of the first linear section of the wire rope.

8. The tracking photovoltaic solar system according to claim 6, wherein said primary rotating means comprises two pairs of sheaves, each pair being respectively linked by a wire rope, and wherein the first linear actuator comprises one jack situated between said two pairs of sheaves.

9. The tracking photovoltaic solar system according to claim 1, wherein each half of said array of photovoltaic modules supported by each sub-frame includes two sub-arrays of photovoltaic modules located on each side of said tracker unit torque tube.

10. The tracking photovoltaic solar system according to claim 1, wherein said pair of sub-frames are mechanically cross-linked with a coupling mechanism permitting said pair of sub-frames to rotate in unison around a respective one of said secondary rotation axes and maintaining a symmetry between each half of said array of photovoltaic modules supported by each sub-frame.

11. The tracking photovoltaic solar system according to claim 1, further comprising a linear array comprising a plurality of said dual axis tracker units, wherein said dual axis tracker units are controlled by a distributed array of electronic controllers, and wherein said distributed array of electronic controllers comprises a single master controller and multiple slave controllers attached to each tracker unit, the master controller being configured to compute the motion trajectories of each tracker unit and to send motion commands to the slave controllers of each tracker unit.

12. The tracking photovoltaic solar system according to claim 11, wherein each slave controller of the corresponding tracker unit is connected to an electrical bus attacked to or supported by a stay of said corresponding tracker unit which defines a housing for said electrical bus which is connected to the master controller.

13. The tracking photovoltaic solar system according to claim 1, wherein the anchoring basis comprises a pre-cast concrete block and a set of anchor structures made out of structural steel profiles.

* * * * *